US011365463B2

(12) United States Patent
Rios et al.

(10) Patent No.: US 11,365,463 B2
(45) Date of Patent: Jun. 21, 2022

(54) PRODUCTION OF CASTABLE LIGHT RARE EARTH RICH LIGHT METAL COMPOSITIONS FROM DIRECT REDUCTION PROCESSES

(71) Applicants: Orlando Rios, Oak Ridge, TN (US); Hunter B. Henderson, Knoxville, TN (US); Michael S. Kesler, Oak Ridge, TN (US); Bruce A. Moyer, Oak Ridge, TN (US); Zachary Sims, Knoxville, TN (US); David Weiss, Manitowoc, WI (US); Ryan Ott, Ames, IA (US); Corby Anderson, Golden, CO (US); Hao Cui, Golden, CO (US); Scott McCall, Livermore, CA (US)

(72) Inventors: Orlando Rios, Oak Ridge, TN (US); Hunter B. Henderson, Knoxville, TN (US); Michael S. Kesler, Oak Ridge, TN (US); Bruce A. Moyer, Oak Ridge, TN (US); Zachary Sims, Knoxville, TN (US); David Weiss, Manitowoc, WI (US); Ryan Ott, Ames, IA (US); Corby Anderson, Golden, CO (US); Hao Cui, Golden, CO (US); Scott McCall, Livermore, CA (US)

(73) Assignees: UT-Battelle, LLC, Oak Ridge, TN (US); University of Tennessee Research Foundation, Knoxville, TN (US); Eck Industries Incorporated, Manitowoc, WI (US); Iowa State University Research Foundation, Inc., Ames, IA (US); Colorado School of Mines, Golden, CO (US); Lawrence Livermore National Security, LLC, Livermore, CA (US)

(*) Notice: Subject to any disclaimer, the term of this patent is extended or adjusted under 35 U.S.C. 154(b) by 0 days.

(21) Appl. No.: 16/781,635

(22) Filed: Feb. 4, 2020

(65) Prior Publication Data
US 2021/0355565 A1    Nov. 18, 2021

Related U.S. Application Data

(60) Provisional application No. 62/800,582, filed on Feb. 4, 2019.

(51) Int. Cl.
*C22C 21/06* (2006.01)
*C22C 1/02* (2006.01)
(Continued)

(52) U.S. Cl.
CPC .............. *C22C 21/06* (2013.01); *C22C 1/026* (2013.01); *C22C 1/0416* (2013.01); *C22C 1/0491* (2013.01); *B82Y 40/00* (2013.01)

(58) Field of Classification Search
None
See application file for complete search history.

(56) References Cited

U.S. PATENT DOCUMENTS

| 5,037,608 | A | 8/1991 | Tarcy et al. |
| 5,238,646 | A | 8/1993 | Tarcy et al. |

(Continued)

FOREIGN PATENT DOCUMENTS

| CN | 101 058 866 A | 10/2007 |
| WO | WO 2017/007908 A1 | 1/2017 |

OTHER PUBLICATIONS

Lyle et al. "Aluminum Alloys." Ullmann's Encyclopedia of Industrial Chemistry. p. 12. Jun. 15, 2000. (Year: 2000).*

(Continued)

*Primary Examiner* — Brian D Walck
(74) *Attorney, Agent, or Firm* — Klarquist Sparkman, LLP

(57) ABSTRACT

The disclosure concerns methods for making a composition comprising a light metal and an intermetallic comprising the light metal and a light rare earth element. The composition also may include a plurality of nanoparticles comprising an oxide of the light metal. The method includes directly reducing a light rare earth element precursor compound in a melt of the light metal, thereby forming the light rare earth element and nanoparticles of the light metal oxide.

19 Claims, 24 Drawing Sheets
(7 of 24 Drawing Sheet(s) Filed in Color)

(51) Int. Cl.
*C22C 1/04* (2006.01)
*B82Y 40/00* (2011.01)

(56) References Cited

U.S. PATENT DOCUMENTS

| | | |
|---|---|---|
| 2017/0335437 A1 | 11/2017 | Shyam et al. |
| 2018/0080102 A1 | 3/2018 | Rios et al. |
| 2018/0080103 A1 | 3/2018 | Plotkowski et al. |
| 2018/0237893 A1 | 8/2018 | Rios et al. |
| 2018/0327890 A1 | 11/2018 | Shyam et al. |
| 2019/0085431 A1 | 3/2019 | Rios et al. |

OTHER PUBLICATIONS

Chen, et al., "Effect of Processing Parameters on Microstructure and Mechanical Properties of an Al—$Al_{11}Ce_3$—$Al_2O_2$ In-Situ Composite Produced by Friction Stir Processing", *Metallurgical and Materials Transactions A*, vol. 41A, 2010, pp. 514-521.

Ganiev, et al., "Oxidation of Aluminum Melts with Rare-Earth Metals", *Russian Metallurgy*, vol. 2018, No. 5, 2018.

International Search Report and Written Opinion dated Jul. 22, 2020, issued by the European Patent Office in corresponding International Application No. PCT/US2020/016571 (33 pages).

Sims, et al., "Cerium-Based, Intermetallic-Strengthened Aluminum Casting Alloy: High-Volume Co-product Development", *Journal of Metals*, vol. 68, No. 7, May 23, 2016 (May 23, 2016), pp. 1940-1947.

Sims, et al., "High Performance Aluminum-Cerium Alloys for High-Temperature Applications", *Materials Horizons*, vol. 4, No. 6, Nov. 2017.

Skrzekut, et al., "Structural Characterization of Mechanically Alloyed AlMg—$CeO_2$ Composite", Key Engineering Materials, vol. 641, Apr. 10, 2015.

\* cited by examiner

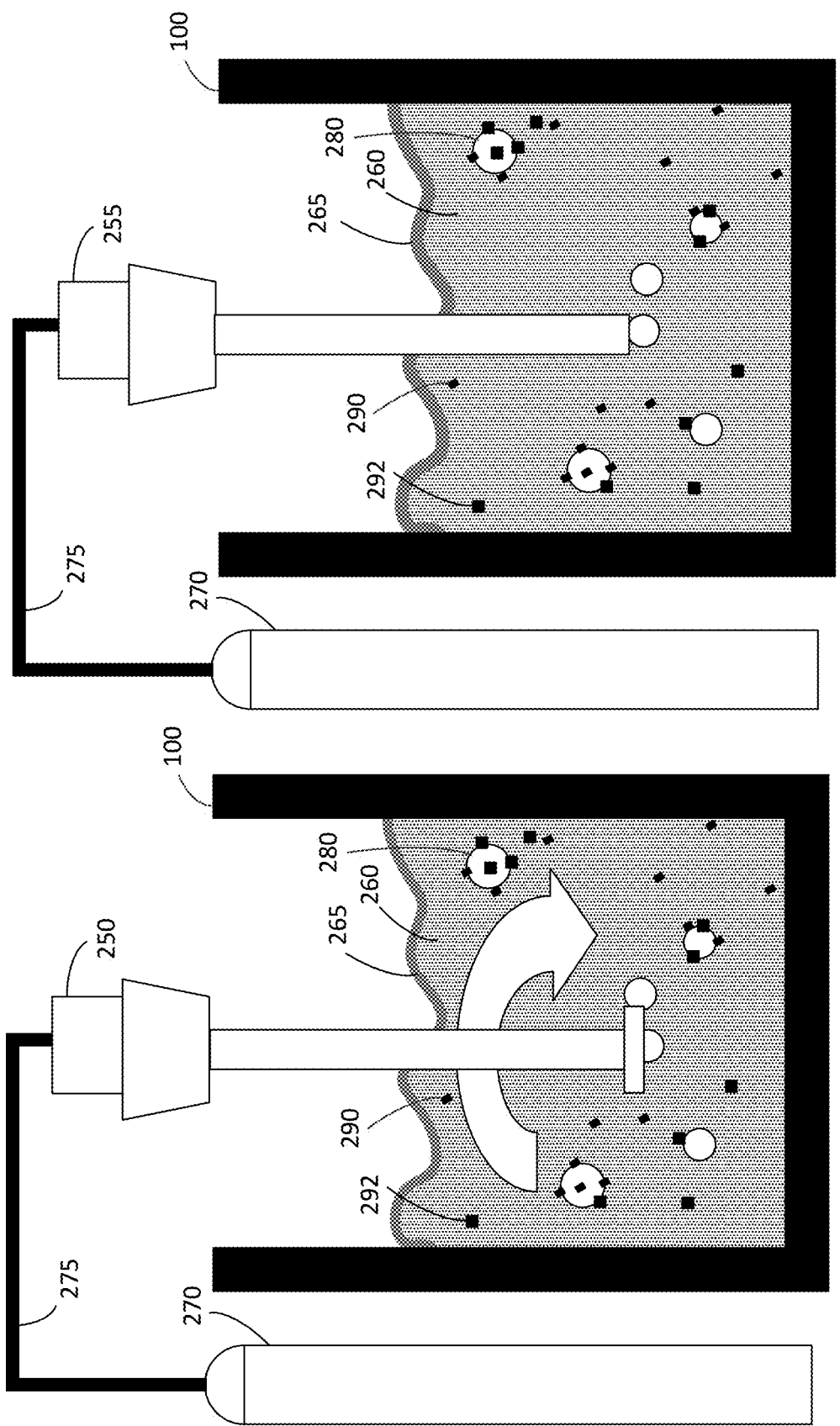

$$Al(l) + CeO_2 \rightarrow Al_2O_3 + (Ce(l), Al(l))$$
$$Mg(l) + CeO_2 \rightarrow MgO + (Ce(l), Mg(l))$$
$$Al(l) + Mg(l) + CeO_2 \rightarrow Al_2O_3 + MgO + (Ce(l), Al(l), Mg(l))$$
$$Al(l) + Mg(l) + CeO_2 \rightarrow Al_2O_3 + MgO + MgAl_2O_4 + (Ce(l), Al(l), Mg(l))$$
$$Al(l) + Si(l) + CeO_2 \rightarrow Al_2O_3 + (Ce(l), Al(l), Si(l))$$
$$Mg(l) + Si(l) + CeO_2 \rightarrow MgO + (Ce(l), Mg(l), Si(l))$$
$$Al(l) + Mg(l) + Si(l) + CeO_2 \rightarrow Al_2O_3 + MgO + (Ce(l), Al(l), Mg(l), Si(l))$$
$$Al(l) + Mg(l) + Si(l) + CeO_2 \rightarrow Al_2O_3 + MgO + MgAl_2O_4 + (Ce(l), Al(l), Mg(l), Si(l))$$

$$Al(l) + Ce(CO_3)_2 \rightarrow CO_2(g) + Al_2O_3 + (Ce(l), Al(l))$$
$$Mg(l) + Ce(CO_3)_2 \rightarrow CO_2(g) + MgO + (Ce(l), Mg(l))$$
$$Al(l) + Mg(l) + Ce(CO_3)_2 \rightarrow CO_2(g) + Al_2O_3 + MgO + (Ce(l), Al(l), Mg(l))$$
$$Al(l) + Mg(l) + Ce(CO_3)_2 \rightarrow CO_2(g) + Al_2O_3 + MgO + MgAl_2O_4 + (Ce(l), Al(l), Mg(l))$$
$$Al(l) + Si(l) + Ce(CO_3)_2 \rightarrow CO_2(g) + Al_2O_3 + (Ce(l), Al(l), Si(l))$$
$$Mg(l) + Si(l) + Ce(CO_3)_2 \rightarrow CO_2(g) + MgO + (Ce(l), Mg(l), Si(l))$$
$$Al(l) + Mg(l) + Si(l) + Ce(CO_3)_2 \rightarrow CO_2(g) + Al_2O_3 + MgO + (Ce(l), Al(l), Mg(l), Si(l))$$
$$Al(l) + Mg(l) + Si(l) + Ce(CO_3)_2 \rightarrow CO_2(g) + Al_2O_3 + MgO + MgAl_2O_4 + (Ce(l), Al(l), Mg(l), Si(l))$$

$$Al(l) + Ce(OH)_4 \rightarrow H_2O + Al_2O_3 + (Ce(l), Al(l))$$
$$Mg(l) + Ce(OH)_4 \rightarrow H_2O + MgO + (Ce(l), Mg(l))$$
$$Al(l) + Mg(l) + Ce(OH)_4 \rightarrow H_2O + Al_2O_3 + MgO + (Ce(l), Al(l), Mg(l))$$
$$Al(l) + Mg(l) + Ce(OH)_4 \rightarrow H_2O + Al_2O_3 + MgO + MgAl_2O_4 + (Ce(l), Al(l), Mg(l))$$
$$Al(l) + Si(l) + Ce(OH)_4 \rightarrow H_2O + Al_2O_3 + (Ce(l), Al(l), Si(l))$$
$$Mg(l) + Si(l) + Ce(OH)_4 \rightarrow H_2O + MgO + (Ce(l), Mg(l), Si(l))$$
$$Al(l) + Mg(l) + Si(l) + Ce(OH)_4 \rightarrow H_2O + Al_2O_3 + MgO + (Ce(l), Al(l), Mg(l), Si(l))$$
$$Al(l) + Mg(l) + Si(l) + Ce(OH)_4 \rightarrow H_2O + Al_2O_3 + MgO + MgAl_2O_4 + (Ce(l), Al(l), Mg(l), Si(l))$$

FIG. 23

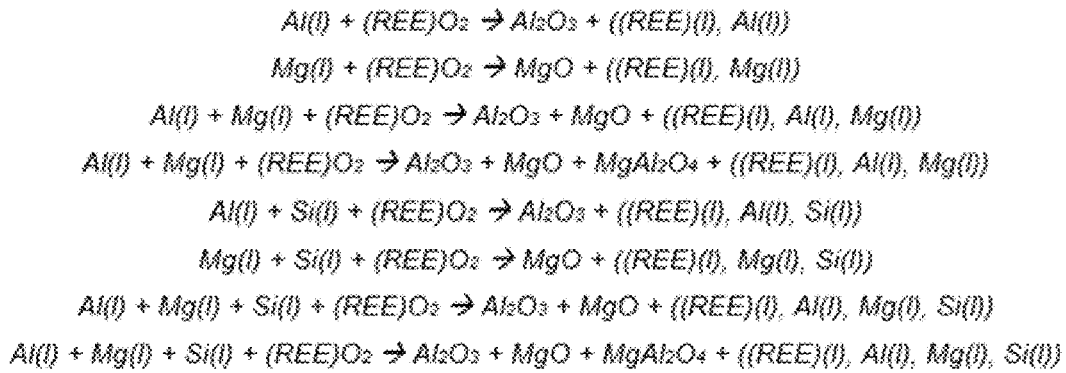
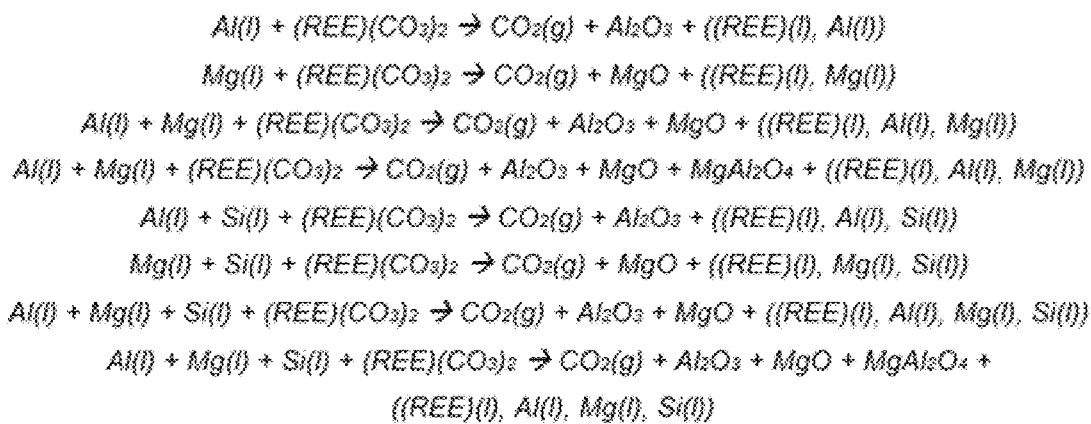
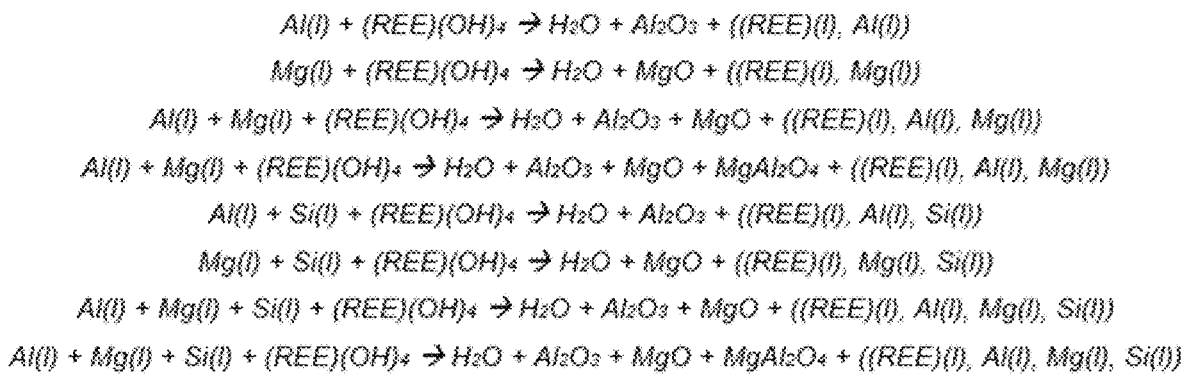
FIG. 24

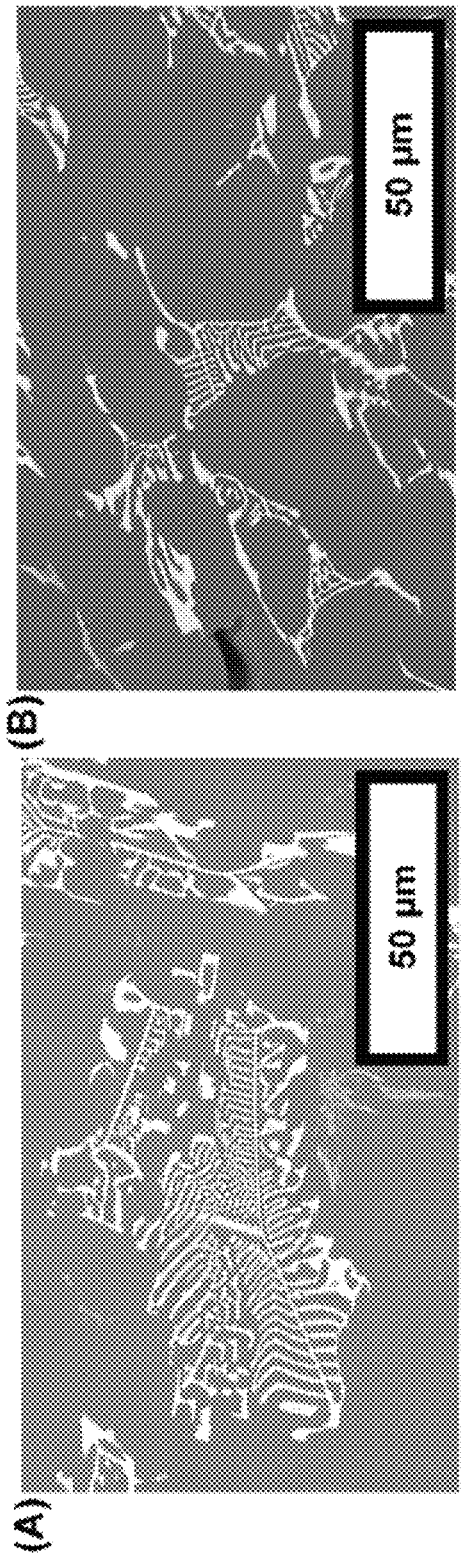
FIG. 27B
FIG. 27A
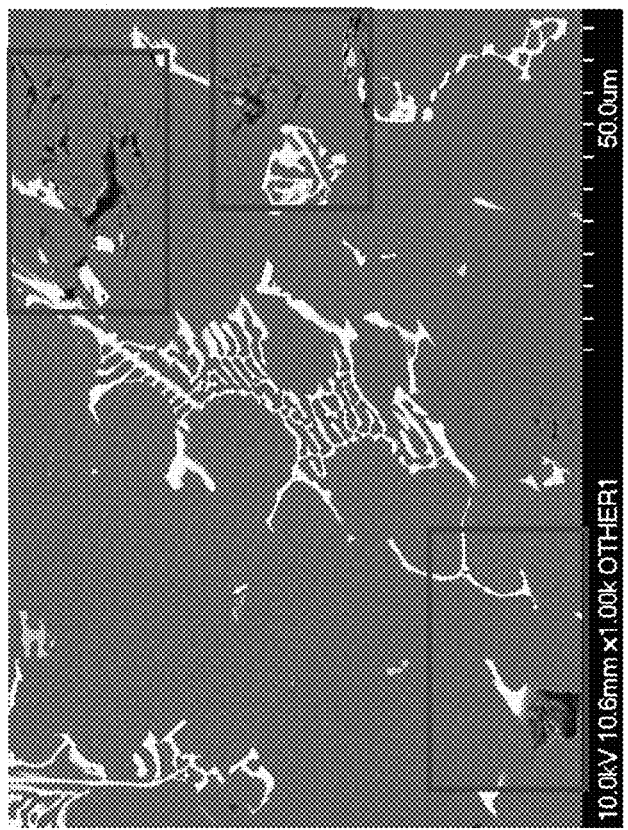
FIG. 28

PRODUCTION OF CASTABLE LIGHT RARE EARTH RICH LIGHT METAL COMPOSITIONS FROM DIRECT REDUCTION PROCESSES

CROSS REFERENCE TO RELATED APPLICATION

This application claims the benefit of the earlier filing date of U.S. Provisional Application No. 62/800,582, filed Feb. 4, 2019, which is incorporated by reference herein in its entirety.

ACKNOWLEDGMENT OF GOVERNMENT SUPPORT

This invention was made with government support under Contract Nos. DE-AC05-00OR22725 and AC02-07CH11358 awarded by the United States Department of Energy. The government has certain rights in the invention.

PARTIES TO JOINT RESEARCH AGREEMENT

The invention arose under agreements between UT-Battelle, LLC, University of Tennessee Research Foundation, Iowa State University of Science and Technology, Eck Industries, Inc., and Colorado School of Mines, funded by the Critical Materials Institute of the United States Department of Energy, which agreements were in effect on or before the effective filing date of the claimed invention.

FIELD

This invention concerns embodiments of a method of making a composition comprising an alloy of a light metal and an intermetallic comprising the light metal and a light rare earth element, as well as compositions made by the disclosed method.

SUMMARY

Embodiments of a composition comprising an alloy of a light metal and an intermetallic comprising the light metal and a light rare earth element (LREE), as well as methods of making the composition are disclosed. In some embodiments, a composition includes (a) an alloy comprising (i) a light metal comprising aluminum, magnesium, or a combination thereof, and (ii) an intermetallic comprising the light metal and an LREE, the LREE comprising cerium, lanthanum, mischmetal, or any combination thereof; and (b) 0.01% (v/v) to 10% (v/v) of a plurality of nanoparticles comprising an oxide of the light metal. The nanoparticles may have an average size within a range of 10-500 nm.

In any of the foregoing embodiments, the composition may comprise 2 wt % to 60 wt % of the LREE. In some embodiments, the LREE comprises cerium. In certain embodiments, the composition further comprises particles of an unreacted light rare earth element precursor compound comprising the light rare earth element.

In some embodiments, a method for making a composition as disclosed herein includes (i) melting a light metal to form a melt, the light metal comprising aluminum, magnesium, or a combination thereof; (ii) agitating the melt to produce a vortex, an eddy current, cavitation, charge buildup, or any combination thereof within the melt; (iii) adding a powder comprising an LREE precursor compound to the melt while agitating the melt to reduce at least a portion of the LREE precursor compound and form a molten composition comprising the light metal, the LREE, and particles comprising an oxide of the light metal, the LREE comprising cerium, lanthanum, mischmetal, or any combination thereof; and (iv) cooling the molten composition to produce a composition comprising (i) an alloy of the light metal and an intermetallic comprising the light metal and the LREE, and (ii) the particles comprising the oxide of the light metal. In certain embodiments, agitating the melt comprises mechanically or magnetically stirring the melt, or ultrasonication of the melt, or application of a direct or alternating electrical current through the melt, or any combination thereof.

In any of the foregoing embodiments, adding the powder comprising the LREE precursor compound to the melt may further include fluidizing the powder with a gas to provide a fluidized powder, and injecting the fluidized powder into the melt below an upper surface of the melt.

In any of the foregoing embodiments, adding the powder comprising the LREE precursor compound may include selecting an amount of the powder comprising the LREE precursor compound; and serially adding fractions of the selected amount of the powder comprising the LREE precursor compound to the melt at intervals while agitating the melt until all of the selected amount has been added. In some embodiments, serially adding fractions of the selected amount at intervals further includes: (a) adding a fraction of the selected amount; (b) agitating the melt for a period of time to reduce at least some of the first fraction; (c) adding a subsequent fraction of the selected amount; (d) agitating the melt for a subsequent period of time to reduce at least some of the subsequent fraction; and (e) repeating steps (c) and (d) until all of the selected amount has been added.

In any of the foregoing embodiments, the LREE precursor compound may comprise an oxide, a carbonate, a hydroxide, a chloride, a chlorite, a perchlorate, a fluoride, a fluorite, an oxalate, a sulfide, a sulfate, a sulfite, a phosphide, a phosphate, or any combination thereof of the LREE. In some embodiments, the LREE precursor compound comprises cerium oxide, cerium carbonate, cerium hydroxide, or any combination thereof. In any of the foregoing embodiments, the method may further include removing at least some of the particles comprising the oxide of the light metal from the molten composition before cooling the molten composition. In any of the foregoing embodiments, the molten composition may further comprise particles comprising unreacted LREE precursor compound, and the method further comprises removing at least some of the particles comprising unreacted LREE precursor compound from the molten composition before cooling the molten composition.

In any of the foregoing embodiments, the method may be a continuous or semi-continuous method, the method further comprising: (i) continuously adding light metal or serially adding amounts of the light metal to the melt at intervals with continuous agitation; (ii) continuously adding powder comprising the LREE precursor compound or serially adding amounts of the powder comprising the LREE precursor compound to the melt at intervals with continuous agitation; (iii) continuously transferring molten composition to a die caster or serially transferring portions of the molten composition at intervals to the die caster; (iv) transferring molten composition from the die caster to a series of molds; and (v) cooling the molten composition in the molds to produce the composition.

The foregoing and other objects, features, and advantages of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 15 is a schematic diagram illustrating one embodiment of a method for degassing a molten composition comprising a light metal, an LREE, and light metal oxide particles and/or unreacted LREE precursor compound particles.

FIG. 16 is a schematic diagram illustrating another embodiment of a method for degassing a molten composition comprising a light metal, an LREE, and light metal oxide particles and/or unreacted LREE precursor compound particles.

FIG. 23 shows several exemplary chemical equations for preparation of a molten composition from a cerium precursor compound, a light metal, and, optionally, silicon.

FIG. 24 shows several exemplary chemical equations for preparation of a molten composition from an LREE precursor compound, a light metal, and, optionally, silicon.

FIGS. 27A and 27B are scanning electron microscopy (SEM) images of eutectic colonies taken from an Al-8Ce-10Mg alloy prepared using a traditional process (FIG. 27A) and an Al-10Mg-8 wt % Ce carbonate composition prepared using an embodiment of the disclosed method with a cerium carbonate precursor.

FIG. 28 is an SEM image showing a eutectic Al$_{11}$Ce$_3$ colony present in an Al-10Mg-8 wt % Ce carbonate composition prepared by an embodiment of the disclosed method using a cerium carbonate precursor.

DETAILED DESCRIPTION

Figure 2:
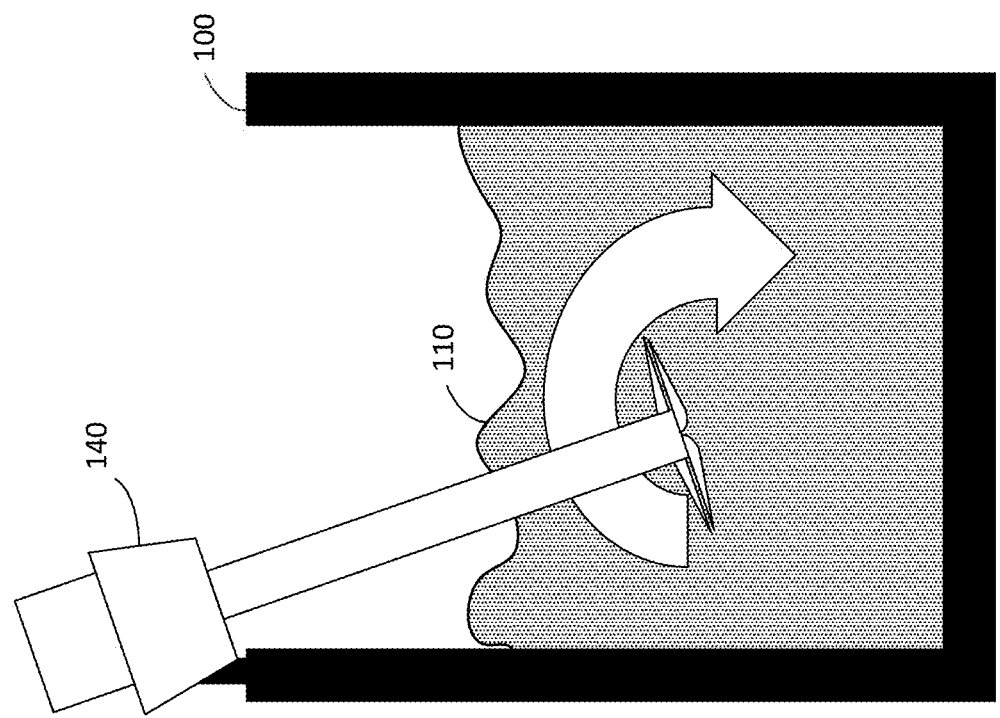
FIG. 2 is a schematic diagram illustrating agitation of a light metal melt with mechanical stirring.

Light metal/light rare earth element (LREE) alloys are desirable in the light metal industry due to their high creep resistance, ease of production, and/or high availability of LREEs. However, LREEs, such as cerium, are expensive and increase the alloy cost. This disclosure concerns embodiments of a method for making a composition comprising an alloy of a light metal and an intermetallic comprising the light metal and a light rare earth element by direct reduction of a light rare earth element precursor compound within a melt of the light metal, and compositions made by the method. Advantageously, some embodiments of the disclosed method utilize byproducts obtained when mining more desirable heavy rare earth elements.

Rare earth compounds are often found together in large ore deposits composed of high concentrations of LREE and much lower concentrations of the heavier, more desirable rare earth elements (REEs). The two most common forms are monazite and bastnaesite. These ores are composed primarily of rare earth phosphates and carbonates, respectively. For example, bastnaesite, the primary source of light rare earths mined and processed globally, typically includes roughly 50% $CeO_2$, 31% $La_2O_3$, 5% $Pr_6O_{11}$, 13% $Nd_2O_3$, and 1% heavier rare earths. The mined ores are put through several processes before reducing the REEs to their pure metal forms. During these processes, the constituent elements of the raw ore are converted through processes such as calcination or roasting, dissolution, and precipitation, among others, into many different compounds, including fluorides, oxides, hydroxides, and peroxides, among others. These compounds, including the raw ores, are precursor compounds to pure metals. In some cases, such as cerium and lanthanum, which together comprise more than 80% of REE deposits, it is often more economical to not fully refine the precursor compounds to pure metals or even to not separate the elemental precursor compounds, leaving a mixed oxide or carbonate instead. Many of these precursor compounds are discarded as waste in mine tailings with complex and costly disposal guidelines and regulations.

In some embodiments, these precursor compounds are used to prepare compositions comprising light earth-rich light metal alloys. Advantageously, it may be less expensive to prepare the alloy composition than to prepare a pure metal or a LREE-light metal alloy by traditional methods using pure LREEs. For instance, preparing a cerium-aluminum alloy by traditional methods may cost 10-20% more than pure aluminum. In contrast, preparing a cerium-aluminum alloy composition by some embodiments of the disclosed method may cost 3-10% less than pure aluminum due to the reduced cost of the precursor compound compared to a pure LREE. Moreover, embodiments of the disclosed method provide a means to mitigate the environmental and economic issues otherwise associated with disposing the precursor compounds as waste.

I. EXPLANATION OF TERMS

The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and compounds similar or equivalent to those described herein can be used in the practice or testing of the present disclosure, suitable methods and compounds are described below. The compounds, methods, and examples are illustrative only and not intended to be limiting, unless otherwise indicated. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited. Furthermore, not all alternatives recited herein are equivalents.

The following terms and definitions are provided:

Alloy: A metal made by melting and mixing two or more different metals. For example, an aluminum alloy is a metal made by combining aluminum and at least one other metal. In some instances, an alloy is a solid solution of metal elements.

Cavitation: Rapid formation and collapse of vapor pockets in a moving liquid.

Eddy current: A current of liquid, especially one having a rotary or whirling motion, running counter to a main current.

Intermetallic or intermetallic phase: A solid-state compound containing two or more metallic elements and exhibiting metallic bonding, defined stoichiometry and/or ordered crystal structure, optionally with one or more non-metallic elements. In some instances, an alloy may include regions of a single metal and regions of an intermetallic phase. In an exemplary binary alloy comprising aluminum and a rare earth element X, where X is Ce, La, or a combination thereof, the intermetallic phase may have a formula $Al_{11}X_3$. Ternary and quaternary alloys may have other intermetallic phases such as, for example, AlCeSi.

Light metal: The term "light metal" generally refers to aluminum, magnesium, titanium, beryllium, and combinations thereof. Light metals are characterized by having a relatively low density, e.g., from 1.5-4.5 $g/cm^3$.

Light rare earth element (LREE): Rare earth elements are any one of the fifteen lanthanides, as well as scandium and yttrium. The term light rare earth element (LREE) refers to rare earth elements with lower atomic numbers, i.e., cerium (Ce), lanthanum (La), praseodymium (Pr), neodymium (Nd), promethium (Pm), and samarium (Sa).

Light rare earth element precursor compound: A compound comprising a LREE cation, which is reducible to form the LREE.

Metal matrix composite (MMC): A material with a primary structure of metal reinforced by another phase.

Microstructure: The fine structure of an alloy (e.g., grains, cells, dendrites, rods, laths, lamellae, precipitates) that can be visualized and examined with a microscope at a magnification of at least 25×. Microstructure can also include nanostructure, i.e., structure that can be visualized and examined with more powerful tools, such as electron microscopy, atomic force microscopy, X-ray computed tomography, etc.

Mischmetal: An alloy of rare earth elements, typically comprising 47-70 wt % cerium and from 25-45 wt % lanthanum. Mischmetal may further include small amounts of neodymium, praseodymium, and/or trace amounts (i.e., less than 1 wt %) of other rare earth elements, and may include small amounts (i.e., up to a total of 15 wt %) of impurities such as Fe or Mg. In some examples, mischmetal comprises 47-70 wt % Ce, 25-40 wt % La, 0.1-7 wt % Pr, 0.1-17 wt % Nd, up to 0.5 wt % Fe, up to 0.2 wt % Si, up to 0.5 wt % Mg, up to 0.02 wt % S, and up to 0.01 wt % P. In certain examples, mischmetal comprises 50 wt % cerium, 25-30 wt % La, with the balance being other rare-earth metals.

Powder: A composition comprising dispersed solid particles that are relatively free flowing from one another and a gas (e.g., air, argon, nitrogen, oxygen, sulfur hexafluoride). As defined herein, a powder may comprise particles having an average diameter less than 1 mm. As used herein, "average diameter" means the mathematical average diameter of a plurality of powder particles.

Vortex: A spinning current that pulls surrounding material down into it.

II. DIRECT REDUCTION PROCESSES FOR MAKING CASTABLE LIGHT RARE EARTH RICH LIGHT METAL COMPOSITIONS

Disclosed are embodiments of a method for making a composition comprising an alloy of a light metal and a light rare earth element (LREE) by direct reduction of a light rare earth element precursor compound within a melt of the light metal. While the following discussion proceeds with reference to light metals, it is understood that the direction reduction process may be applicable to other metals, including metals of Groups 1-11 as well as metals in groups 12-16 falling to the left and below elements classified as metalloids.

In some embodiments, the method includes (i) melting a light metal to form a melt, (ii) agitating the melt, (iii) adding a light rare earth element precursor compound to the melt while agitating the melt to reduce at least a portion of the LREE precursor compound and form a molten composition comprising the light metal, the corresponding light rare earth element, particles comprising an oxide of the light metal, and, optionally, unreacted light rare earth element precursor compound, and (iv) cooling the molten composition to produce a composition comprising (i) an alloy of the light metal and an intermetallic comprising the light metal and the LREE, and (ii) the particles comprising the oxide of the light metal. The light metal oxide particles are formed in situ as the LREE precursor compound is reduced. In some embodiments, the light metal oxide particles are nanoparticles.

Advantageously, adding the LREE precursor compound comprises adding a powder comprising particles of the LREE precursor compound to the melt. The melt is agitated to reduce at least a portion of the LREE precursor compound. By agitate to "reduce at least a portion" means the melt is agitated for a period of time to reduce at least 20 wt % of the added LREE precursor compound. In some embodiments, when only a portion of the LREE precursor compound is reduced, the composition further comprises particles of unreacted LREE precursor compound. In some embodiments, at least 30 wt %, at least 50 wt %, at least 70 wt %, at least 90 wt %, 95 wt %, at least 97 wt %, or at least 99 wt % of the LREE precursor compound is reduced. Conversely, from 0.01-70 wt % of an initial amount of the LREE precursor compound may remain in the composition as particles of unreacted LREE precursor compound. In some embodiments, the composition may include unreacted LREE precursor compound in an amount ranging from 0.5-30 wt % or from 1-20 wt % of the initial amount. The particles of unreacted LREE precursor compound may be the same size as the initially added particles or smaller than the initially added particles. Reduction is evidenced by the presence of intermetallics comprising the LREE in the composition, e.g., as determined by X-ray diffraction (XRD), electron dispersive spectroscopy (EDS), and/or scanning electron microscopy (SEM) or transmission electron microscopy (TEM) imaging. An absence or reduction in XRD peaks corresponding to the LREE precursor compound is further evidence of successful reduction.

In some embodiments, the light metal comprises aluminum, magnesium, or a combination thereof. In any of the foregoing embodiments, the LREE may comprise cerium, lanthanum, mischmetal, or any combination thereof.

Direct reduction in the melt occurs by the following general reaction:

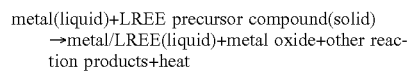

metal(liquid)+LREE precursor compound(solid)
→metal/LREE(liquid)+metal oxide+other reaction products+heat As shown above, chemical energy is released as heat during the reaction. Thus, the reaction can be characterized as an aluminothermic and/or magnesiothermic reaction. The energy excess is due to the difference in Gibbs free energy between the LREE precursor compounds and resulting metal oxides. Generally, the LREE precursor compounds have Gibbs free energy values greater than those of light metal oxides, such as aluminum oxide and magnesium oxide. Advantageously, the released heat energy lowers the overall energy needed to retain the melt at a given temperature, thereby reducing the energy requirements of the direct reduction process. Other reaction products may include carbon dioxide and water, among others, depending on the LREE precursor compound composition.

Exemplary LREE precursor compounds include, but are not limited to, oxides, carbonates, hydroxides, chlorides, chlorites, perchlorates, fluorides, fluorites, oxalates, sulfides, sulfates, sulfites, phosphides, phosphates, or any combination thereof of the LREE. In some embodiments, the LREE precursor compounds are LREE oxides, carbonates, hydroxides, and combinations thereof. It is not necessary to provide the LREE precursor compound in pure form. In some embodiments, the LREE precursor compound is provided by an ore comprising one or more LREE precursor compounds.

Suitable ores include, but are not limited to monazite and bastnaesite. The LREE precursor compound may be at least partially purified from the ore, or the ore may be used directly. In certain embodiments, the LREE is cerium. In some examples, the LREE precursor compound comprises, consists of, or consists essentially of $CeO_2$. In this context, "consists essentially of" means that the LREE precursor compound is at least 95 wt % $CeO_2$ and includes less than 1 wt % of any other LREE besides Ce.

The light metal is placed into a vessel and heated until a light metal melt is formed. In some embodiments, the light metal comprises aluminum, magnesium, or a combination thereof. In certain embodiments, additional alloying elements are combined with the light metal. For example, silicon may be combined with the light metal to provide a light metal melt further comprising molten silicon.

Optionally, the light metal melt may be degassed to remove any undesirable components and/or unmelted solid particles. Degassing may be performed with a reactive gas (e.g., nitrous oxide or chlorine) and/or a non-reactive gas (e.g., nitrogen or argon). Degassing may be performed until a density of the melt is >90% of a theoretical melt density. The light metal melt may then be fluxed with an alkaline-based flux (e.g., ammonia, ammonium chloride, or an amine) to remove any dissolved gases and undesirable solids, which are separated from the light metal melt before proceeding.

The light metal melt is agitated sufficiently to provide thorough mixing when the LREE precursor compound is added into the melt. Agitation is sufficiently vigorous to produce turbulence within the melt. The turbulence may be in the form of a vortex, an eddy current, cavitation, charge buildup, or any combination thereof within the light metal melt and/or particles contained within the light metal melt. Advantageously, the turbulence produces regions of opposing flow velocities, which aid in particle deagglomeration when the LREE precursor compound is added to the light metal melt. In some embodiments, the LREE precursor compound has a lower density than the light metal and a vortex within the light metal melt helps to pull the lower density LREE precursor compound particles into the bulk melt from where they float on the melt surface.

In some embodiments, agitating the melt comprises (i) mechanically or magnetically stirring the melt with a sufficient velocity to produce a vortex or an eddy current in the melt, (ii) ultrasonication of the melt to produce cavitation within the melt, (iii) application of a direct or alternating electrical current through the melt to produce an eddy current and/or charge buildup within the melt and/or any particles contained therein or (iv) any combination thereof. Without wishing to be bound by a particular theory of operation, application of an alternating or direct electrical current may produce agitation within the melt by creating a potential such that atoms and particles in the melt acquire the same charge and repeal one another. When particles of the LREE precursor compound are added to the melt, application of an electrical current may aid in particle dispersion, deagglomeration, and/or particle wetting.

Figure 1:
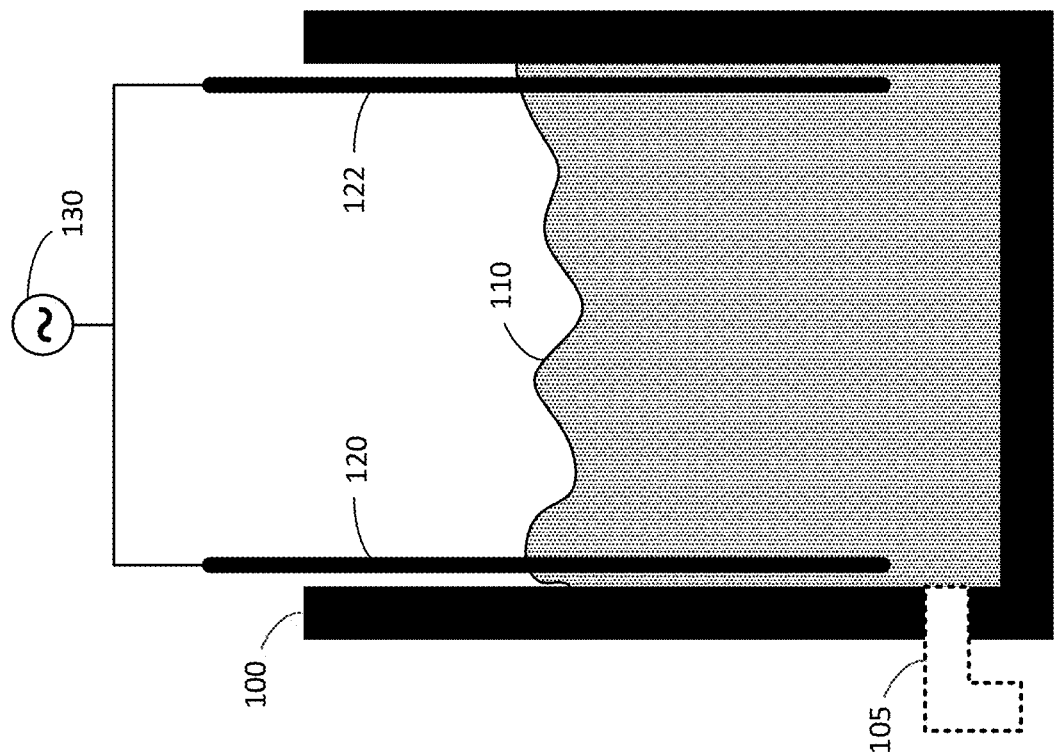
FIG. 1 is a schematic diagram illustrating agitation of a light metal melt with an alternating electrical current.
Figure 3:
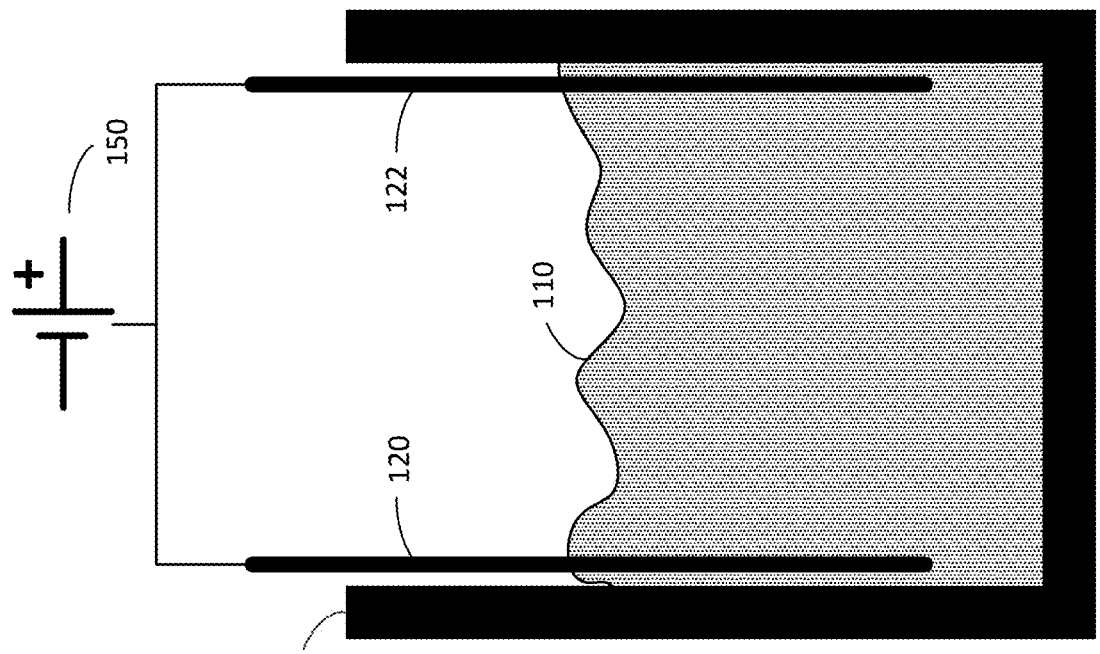
FIG. 3 is a schematic diagram illustrating agitation of a light metal melt with mechanical stirring and an alternating electrical current.
Figure 4:
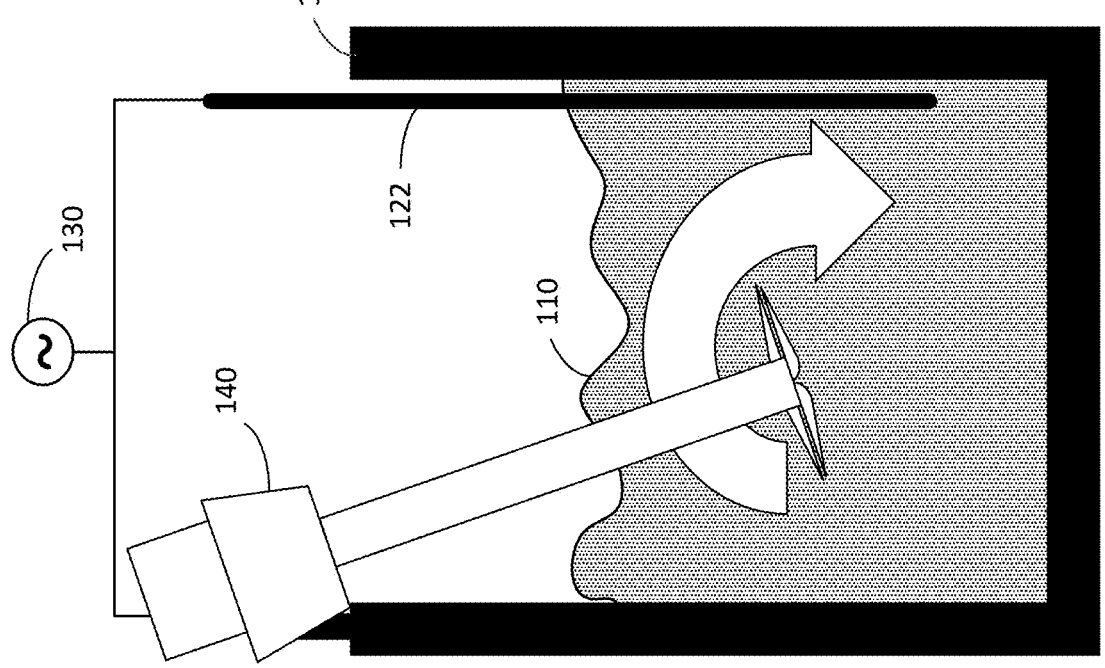
FIG. 4 is a schematic diagram illustrating agitation of a light metal melt with a direct electrical current.
Figure 6:
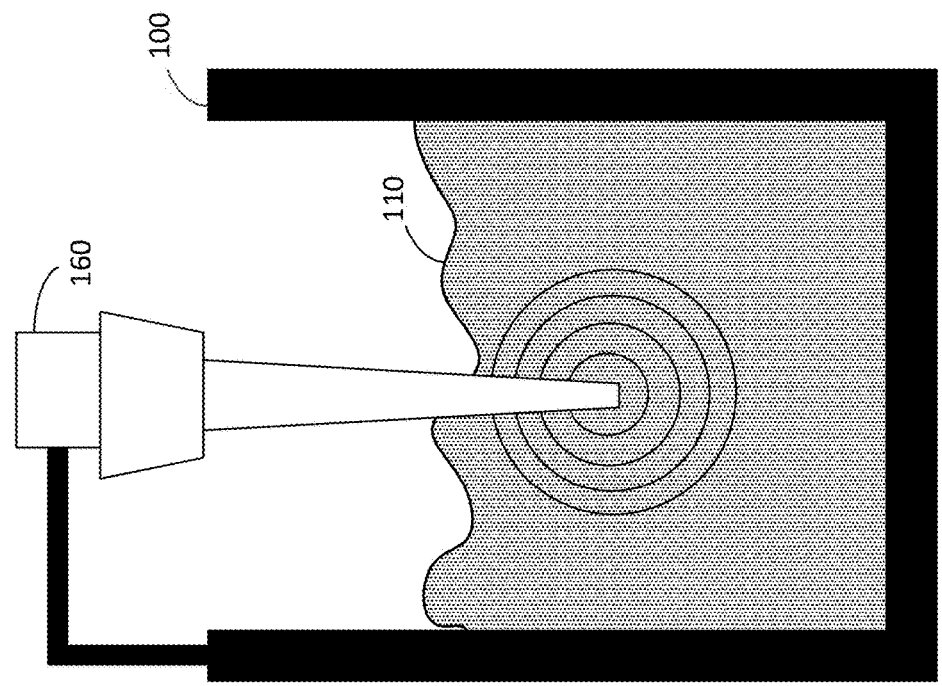
FIG. 6 is a schematic diagram illustrating agitation of a light metal melt with ultrasonication.
Figure 5:
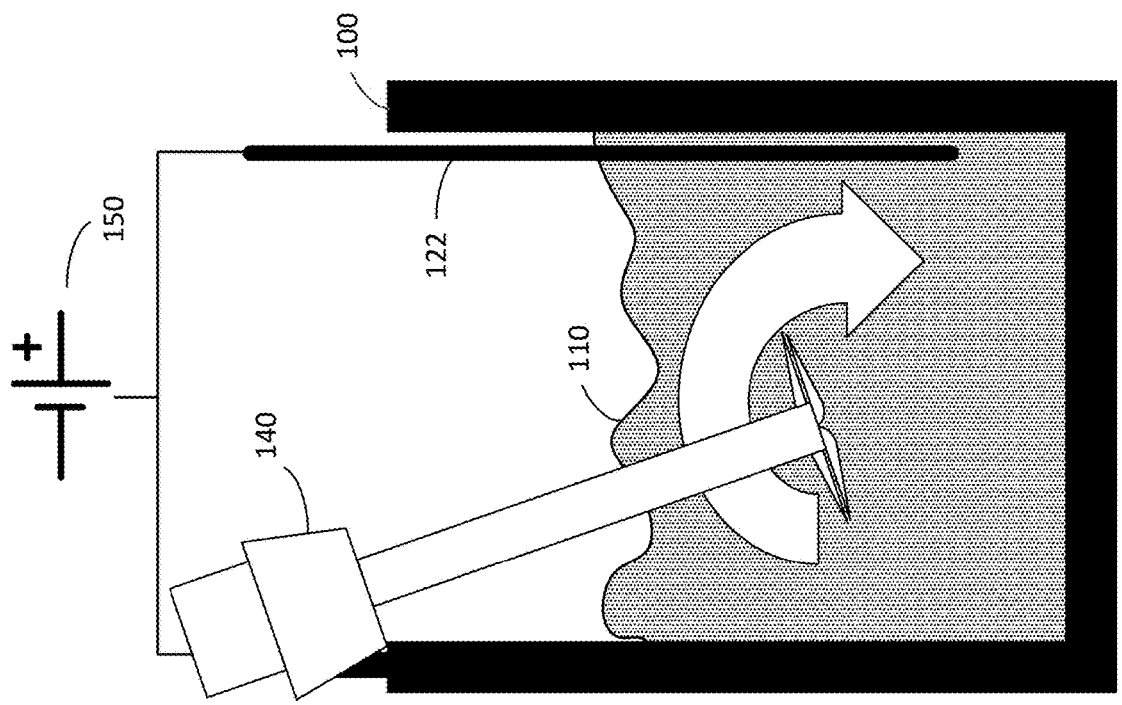
FIG. 5 is a schematic diagram illustrating agitation of a light metal melt with mechanical stirring and a direct electrical current.
Figure 8:
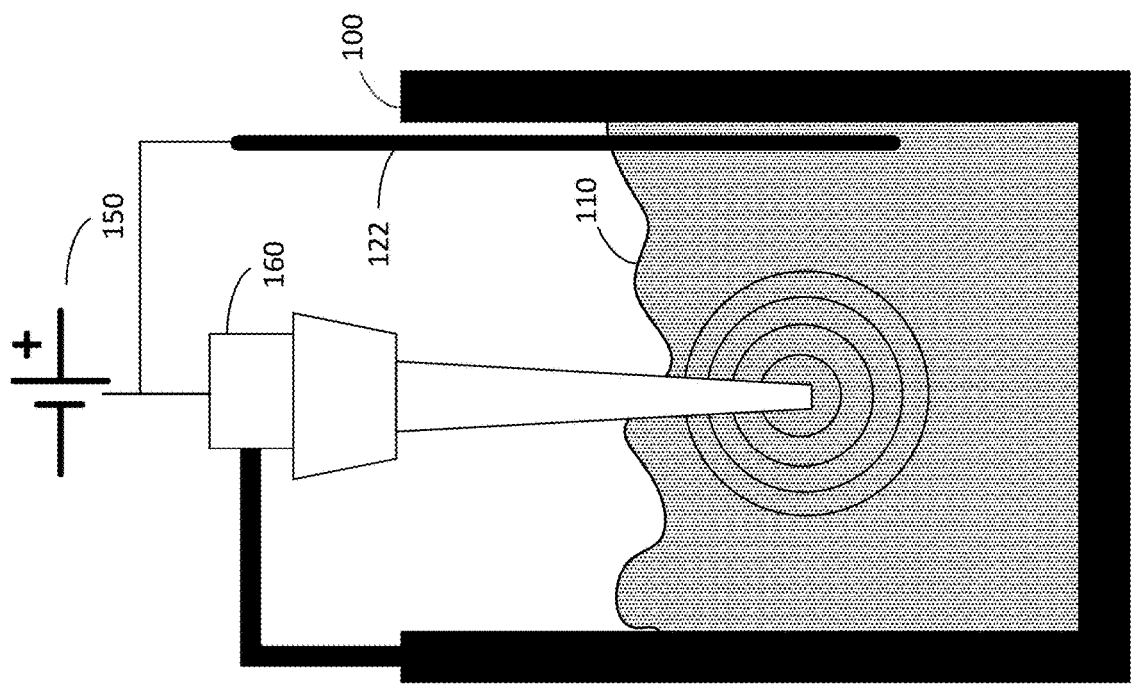
FIG. 8 is a schematic diagram illustrating agitation of a light metal melt with ultrasonication and electrodynamic stirring (induction and/or electric current).
Figure 7:
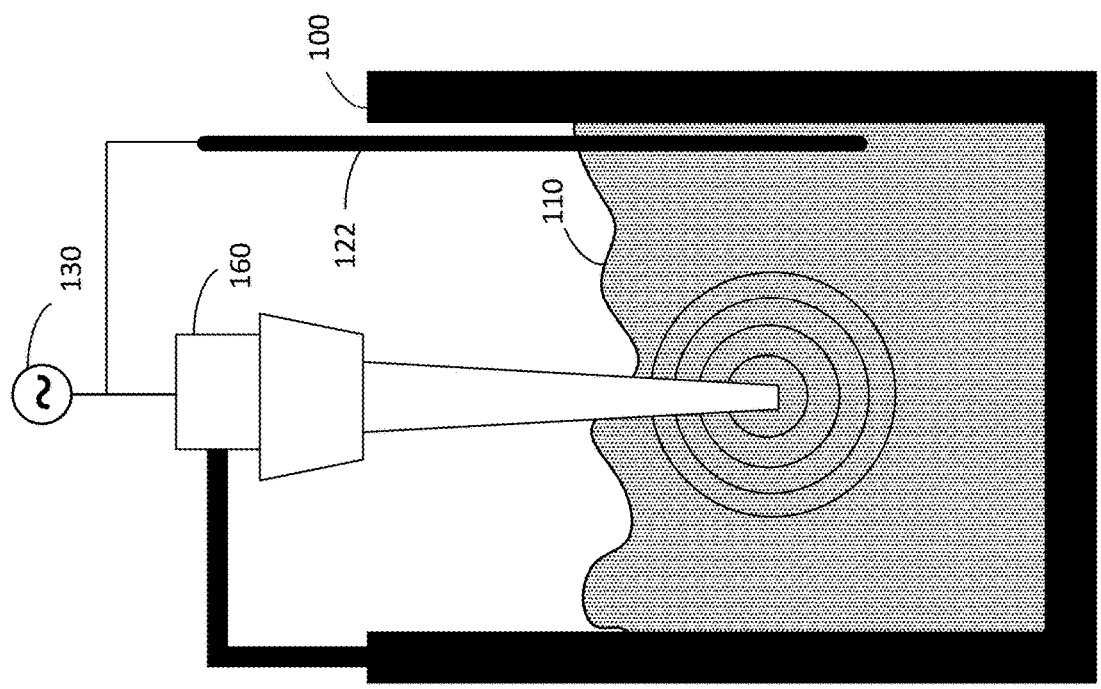
FIG. 7 is a schematic diagram illustrating agitation of a light metal melt with ultrasonication and an alternating electrical current.

FIGS. 1-16 show exemplary embodiments of methods for agitating a melt, adding particles of an LREE precursor compound to the melt, and degassing the melt. In one example, as shown in FIG. 1, agitation comprises passing an alternating current through the light metal melt. FIG. 1 shows a vessel 100 containing a light metal melt 110. The vessel 100 optionally includes an outlet 105, or a plurality of outlets 105. (Although not expressly shown in FIGS. 2-16, it is understood that the vessel in each of the figures optionally includes one or more outlets.) Two electrodes 120, 122 are inserted into the melt, and an alternating current supply 130 provides an alternating current that passes through the melt 110. In another example, agitation comprises mechanically stirring the melt with a stirrer 140 (FIG. 2). Although a single stirrer 140 is depicted in the embodiment of FIG. 2, it is understood that a plurality of stirrers may be utilized. In another example, agitation comprises mechanically stirring the melt and passing an alternating current through the melt (FIG. 3). In the exemplary embodiment of FIG. 3, the stirrer also functions as an electrode. In another example, agitation comprises passing a direct current through the melt 110 using a direct current supply 150 (FIG. 4). In another example, agitation comprises mechanically stirring the melt and passing a direct current through the melt (FIG. 5). In the exemplary embodiment of FIG. 5, the stirrer also functions as an electrode. In another example, agitation comprises ultrasonication of the melt 110, e.g., using with an ultrasonic sonotrode 160 (FIG. 6). Although a single ultrasonic sonotrode 160 is depicted in the embodiment of FIG. 6, it is understood that a plurality of ultrasonic sonotrodes may be utilized. In another example, agitation comprises ultrasonication and passing an alternating current through the melt (FIG. 7). In another example, agitation comprises ultrasonication and passing a direct current through the melt (FIG. 8). In the exemplary embodiments of FIGS. 7 and 8, the sonotrode also functions as an electrode. In another example, agitation comprises magnetic stirring, such as by electromagnetic acoustic transduction, induction, or asymmetric electromagnetic melt stirring; these methods apply magnetic fields to mix the melt and promote deagglomeration.

A light rare earth element precursor compound is selected and added to the light metal melt with continued agitation to reduce at least a portion of the LREE precursor compound and form a molten composition. The molten composition comprises the light metal, the corresponding reduced LREE, and in situ-formed particles comprising an oxide of the light metal. In some embodiments, after reduction, the molten composition comprises from 4 wt % to 60 wt % of the LREE. In certain embodiments, the molten composition further comprises unreacted LREE precursor compound. In some cases, from 0-70 wt %, such as from 0.01-70 wt %, 0.5-30 wt % or from 1-20 wt %, of an added amount of LREE precursor compound remains unreacted.

In some embodiments, adding the LREE precursor compound comprises adding a powder comprising the LREE precursor compound. The powder may include particles having an average size ranging from 1 µm to 1 mm in diameter. In some embodiments, the powder includes particles having an average size within a range of from 1 µm to 0.3 mm, or from 30-100 µm.

In any of the foregoing embodiments, a selected amount of the LREE precursor compound may be added to the light metal melt in a single batch addition, in serial fractions of the selected amount added at intervals, or by continuous metered addition. Several exemplary embodiments of methods for adding the LREE precursor compound are described and shown in FIGS. 9-14. It is understood that, although the exemplary embodiments illustrate mechanical stirring of the added LREE precursor compound, any one or any combination of the previously described agitation methods may be used. It is further understood that although a single mechanical stirrer 140 is depicted in FIGS. 9-14, a plurality of mechanical stirrers may be utilized.

Figure 10:
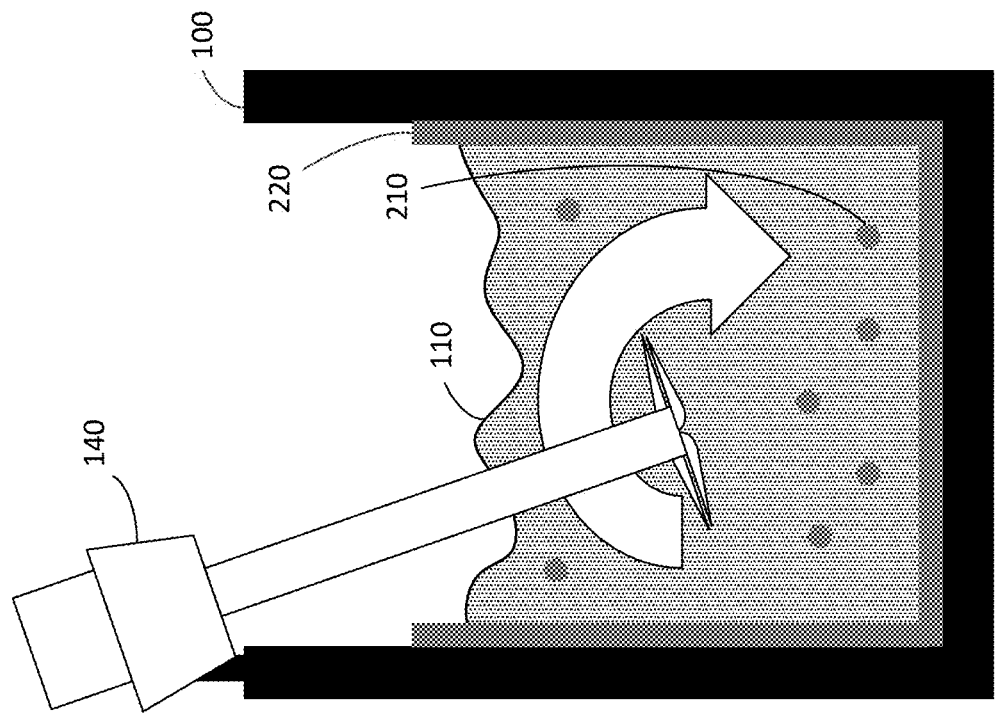
FIG. 10 is a schematic diagram illustrating addition of a selected amount of an LREE precursor compound in the form of a reactive liner for a vessel containing a light metal melt.
Figure 9:
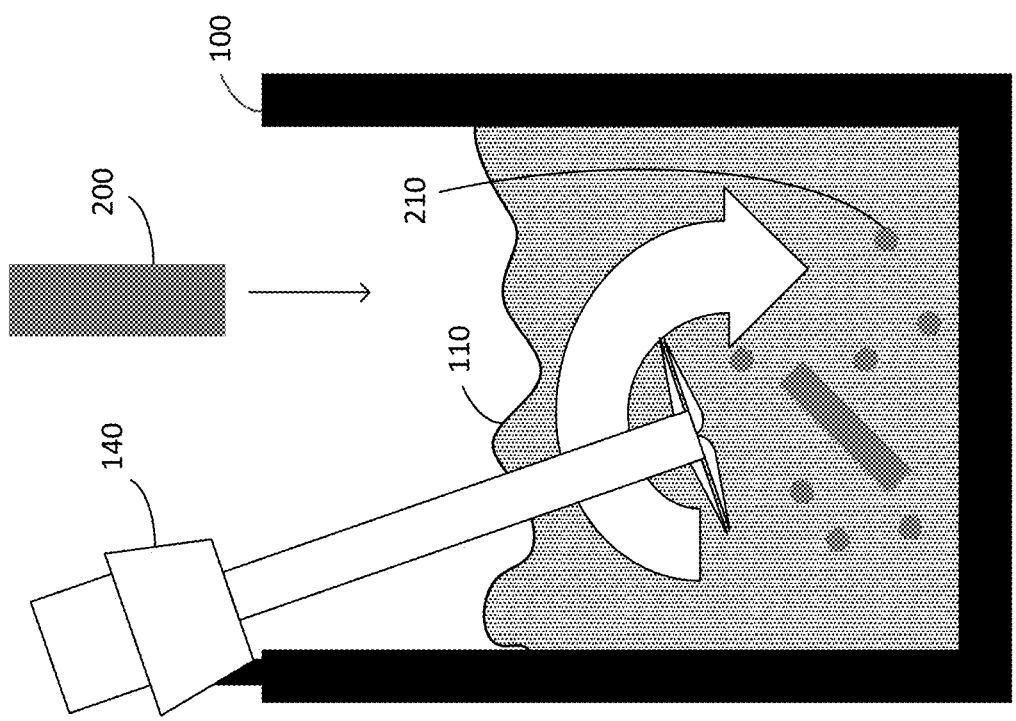
FIG. 9 is a schematic diagram illustrating addition of a selected amount of a light rare earth element (LREE) precursor compound in the form of a compressed powder brick to a light metal melt.
Figure 12:
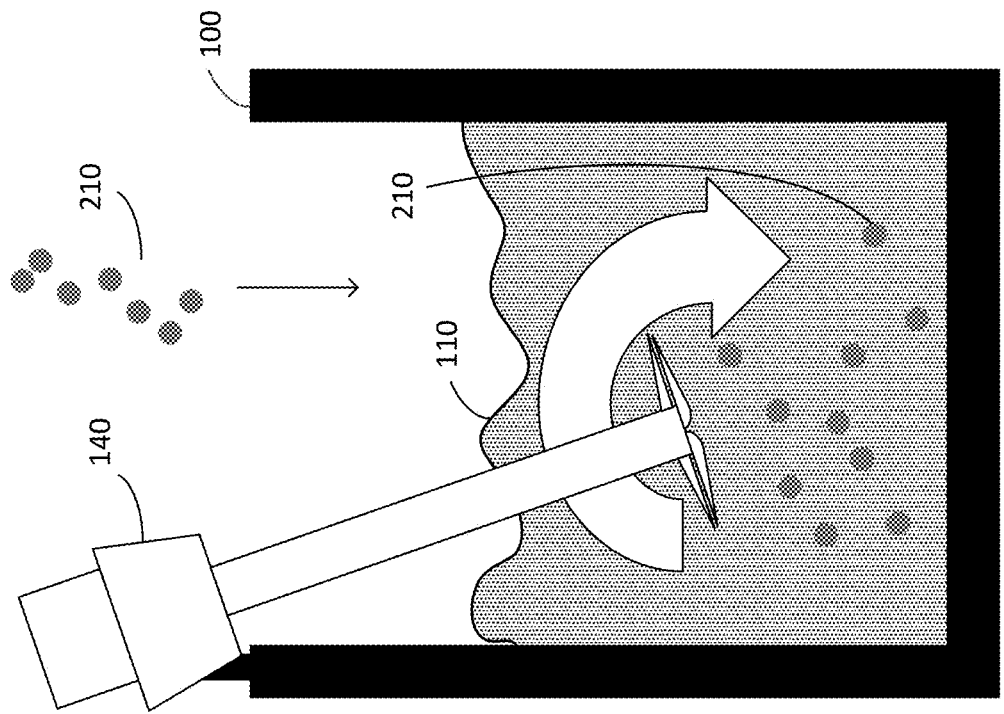
FIG. 12 is a schematic diagram illustrating direct addition of a selected amount of an LREE precursor compound particles to a light metal melt.
Figure 11:
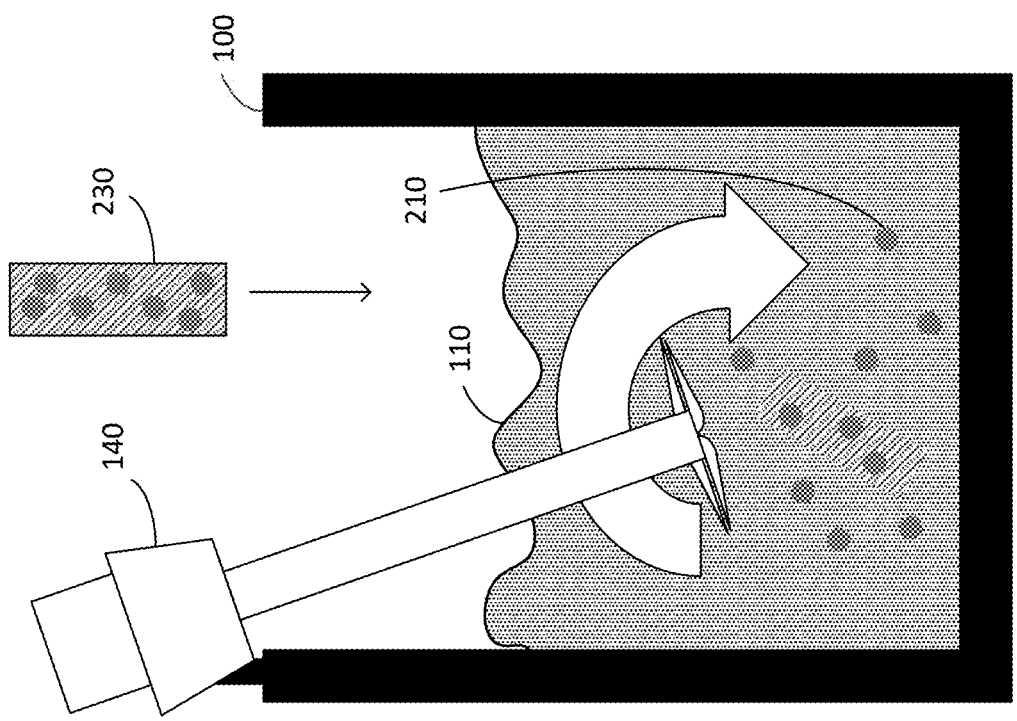
FIG. 11 is a schematic diagram illustrating addition of a selected amount of an LREE precursor compound in the form of a brick comprising a light metal and particles of the LREE precursor compound to a melt of the light metal.

In one example, a mass of compressed powder 200 comprising the selected amount of the LREE precursor compound is added to the light metal melt 110, whereby the mass 200 breaks down in the melt to produce LREE precursor compound particles 210 which are subsequently reduced (FIG. 9). As used herein, the term "mass" means a coherent body of matter (e.g., agglomerated powder particles) with no definite shape. In some cases, a plurality of compressed powder bodies 200, each mass comprising a fraction of the selected amount of the LREE precursor compound, is added in a single addition or single masses are serially added to the light metal melt 110 at selected intervals. In another example, the selected amount of the LREE precursor compound is formed into a reactive liner 220 that is inserted into the vessel 100, whereby the liner 220 breaks down in the melt 110 to produce LREE precursor compound particles 210 which are subsequently reduced (FIG. 10). In another example, the selected amount of LREE precursor compound is combined with molten light metal and formed into a solidified mass 230 comprising the light metal and particles of the LREE precursor compound; the mass 230 is added to the light metal melt 110, whereby the mass breaks down in the melt to produce LREE precursor compound particles 210 which are subsequently reduced (FIG. 11). In some cases, a plurality of masses 230, each mass comprising a fraction of the selected amount of the LREE precursor compound, is added in a single addition or single bodies are serially added to the light metal melt 110 at selected intervals.

In another example, a loose powder comprising the selected amount of LREE precursor compound particles 210 is added directly to the light metal melt 110, whereby the particles are subsequently reduced (FIG. 12); the powder may be added continuously or in serial fractions at selected intervals. In another example (not shown), a packet comprising the loose powder comprising LREE precursor compound particles wrapped in a foil comprising the light metal is added directly to the light metal melt, whereby the foil melts and the particles are subsequently dispersed in the melt and reduced; in some instances, a plurality of packets, each packet comprising a fraction of the selected amount of the LREE precursor compound, is added in a single addition or single packets are serially added to the light metal melt at selected intervals.

Figure 13:
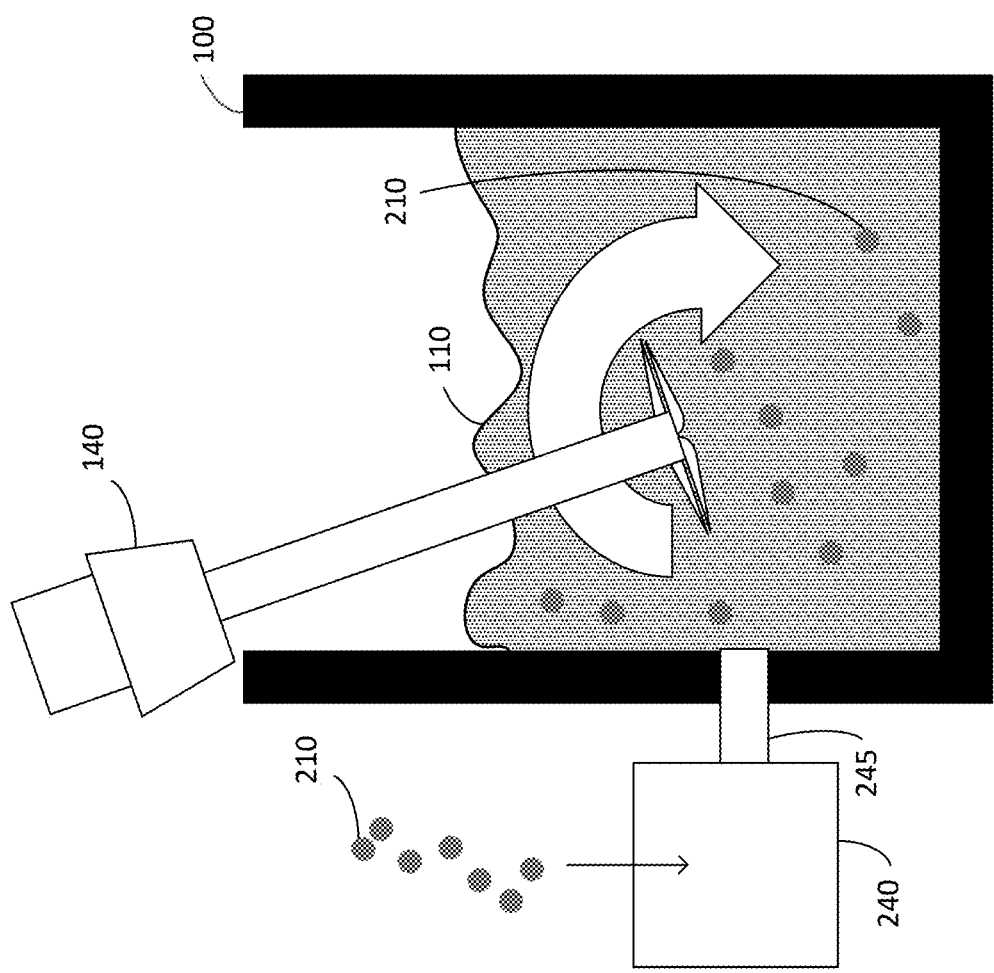
FIG. 13 is a schematic diagram illustrating addition of a selected amount of an LREE precursor compound particles from a hopper via a conduit into a light metal melt.

In another example, a loose powder comprising the selected amount of LREE precursor compound particles 210 is added to a hopper 240 and subsequently conveyed via a conduit 245 through a wall of the vessel 100 into the melt 110, whereby the particles are subsequently reduced (FIG. 13); the particles may be added continuously or in serial fractions at selected intervals. Advantageously, the particles 210 are added into the body of the melt 110, i.e., the particles are introduced below an upper surface of the melt. In certain embodiments, the LREE precursor compound particles 210 are fluidized with a gas (e.g., nitrogen, argon air, oxygen, sulfur hexafluoride) in the conduit 245 and the fluidized powder is added to the melt 110. In some examples, the particles are fluidized with nitrogen. Although the embodiment of FIG. 13 shows a single hopper 240 and single conduit 245, it is understood that a plurality of hoppers 240 and/or conduits 245 may be utilized to inject LREE precursor compounds into multiple locations within the vessel 100.

In another example, the mechanical stirrer 140 includes a stirrer tip injector 142 and a loose powder comprising the selected amount of LREE precursor compound particles 210 is added to a hopper 240 and subsequently conveyed via a conduit 245 and through the stirrer tip injector 142 into the light metal melt 110, whereby the particles are subsequently reduced (FIG. 14); the particles may be added continuously or in serial fractions at selected intervals. In certain embodiments, the LREE precursor compound particles 210 are fluidized with a gas (e.g., nitrogen, argon air, oxygen, sulfur hexafluoride) in the conduit 245 and/or within the mechanical stirrer 140 and the fluidized powder is injected into the melt 110 through the stirrer tip injector 142. In some examples, the particles are fluidized with nitrogen.

In some embodiments, adding the selected amount of LREE precursor compound in serial fractions comprises adding serial fractions including from 1 wt % to 20 wt % of the LREE precursor compound to the light metal melt at selected intervals. The selected intervals may range from 5 seconds to 1 hour or more, such as from 10 seconds to 60 minutes, 1-30 minutes, 5-20 minutes, or 5-10 minutes. Serial, or metered, additions may facilitate more thorough mixing and reduce or prevent particle agglomeration. In embodiments, where the LREE precursor compound particles are added continuously, agitation is also continuous.

After the selected amount of the LREE precursor compound has been added to the light metal melt, agitation is continued to reduce at least a portion of the LREE precursor compound and form a molten composition comprising the light metal, the corresponding light rare earth element, and in situ-formed particles comprising an oxide of the light metal. In some instances, the molten composition further comprises particles of unreacted light rare earth element precursor compound. In some embodiments, agitation is continued for a period of time ranging from 5 min to 10 hours, such as from 5 minutes to 5 hours, 5 minutes to 2 hours, 5-60 minutes, 5-30 minutes, 5-20 minutes, or 5-10 minutes. In certain embodiments, the period of time is within a range of from 5-10 minutes. After reducing at least a portion of the LREE precursor compound, the molten composition is cooled to provide a solidified composition comprising (i) an alloy of the light metal and an intermetallic comprising the light metal and the LREE, (ii) the particles comprising the oxide of the light metal, and, in some embodiments, (iii) particles comprising unreacted LREE precursor compound.

In any of the foregoing embodiments, the method may further include (i) removing particles comprising the oxide of the light metal from the molten composition before cooling the molten composition, (ii) removing particles comprising the unreacted light rare earth element precursor compound from the molten alloy before cooling the molten composition, or (iii) both (i) and (ii). In some embodiments, removing particles comprising the oxide of the light metal and/or the particles comprising the unreacted light rare earth element precursor compound comprises passing gas bubbles through the molten composition, whereby particles within the molten composition are conveyed by the gas bubbles to an upper surface of the molten composition, the particles comprising the oxide of the light metal, the unreacted light rare earth element precursor compound, or both, and removing the particles from the upper surface of the molten composition.

FIG. 15 shows one embodiment of a method for degassing the molten composition. A degassing device, such as a rotary lance 250, is inserted into the molten composition 260. A gas source 270 is connected via a conduit 275 to the degassing device 250, and a gas is introduced into the molten composition 260. Gas bubbles 280 rise through the molten composition 260. As the gas bubbles 280 rise, light metal oxide particles 290 and/or unreacted LREE precursor compound particles 292 adhere to surfaces of the gas bubbles and are carried to an upper surface of the molten composition 260, whereby they form a froth or slag 265 and are subsequently removed and discarded prior to casting. In another embodiment, the degassing device is a stationary lance 255 as shown in FIG. 16. Without wishing to be bound by a particular theory of operation, light metal oxide particles and/or unreacted LREE precursor compound particles adhere to the gas bubble surfaces by electronic interactions, such as van der Waals forces. Notably, larger particles (e.g., microparticles, such as microparticles having a diameter within a range of 1-10 μm) are preferentially removed by degassing, whereas smaller particles (e.g., nanoparticles, such as nanoparticles having a diameter of less than 500 nm or less than 100 nm) may remain in the molten composition. Thus, in some embodiments, the molten composition includes light metal oxide nanoparticles and/or unreacted LREE precursor compound nanoparticles.

In certain embodiments, as described above with reference to FIGS. 13 and 14, the LREE precursor compound is added as a fluidized powder to the melt. In such embodiments, degassing and removal of particles comprising the oxide of the light metal and/or the particles comprising the unreacted LREE precursor compound may occur simultaneously with the LREE precursor compound reduction as gas bubbles from the fluidized powder rise through the melt and carrying light metal oxide particles and/or unreacted LREE precursor compound particles to the upper surface of the molten composition.

In any of the foregoing embodiments, the process may be a batch process, a semi-continuous process, or a continuous process. In a batch process, a molten composition is prepared by any of the foregoing embodiments and subsequently transferred to a mold or plurality of molds prior to cooling and solidification. The vessel is subsequently refilled, and a new batch of the molten composition is prepared. In a semi-continuous process, the vessel may include an outlet, or a plurality of outlets, in a lower portion of the vessel (see, e.g., outlet 105 in FIG. 1). The outlet may be opened at periodic intervals, allowing a portion of the molten composition to be transferred to a mold or plurality of molds for cooling and solidification. Additional light metal and LREE precursor compound are then added to the vessel as previously described. In a continuous process, the vessel includes an outlet, or a plurality of outlets, in a lower portion of the vessel (e.g., outlet 105 in FIG. 1). The outlet allows continuous transfer of molten composition to molds for cooling and solidification. In some embodiments, the outlet allows continuous transfer of molten composition to a subsequent vessel for degassing prior to transfer to molds for cooling and solidification. Additional light metal and LREE precursor compound are continuously added to the vessel. In a continuous or semi-continuous process, a melting furnace may be utilized to melt the light metal, which is subsequently transferred to the vessel as molten light metal. The molten light metal may be degassed prior to transfer. Alternatively, the light metal may be introduced in solid form into the vessel; in such embodiments, the vessel may include a baffle to separate newly added solid light metal from the molten composition and, upon melting, the light metal flows into the molten composition. In any of the foregoing embodiments, the molten composition may be transferred to a die caster and maintained in the die caster prior to transfer to one or more molds. The molten composition may be maintained in the die caster under an alkaline-based flux or a cover gas (e.g., argon or nitrogen) until ready to pour into molds.

Figure 14:
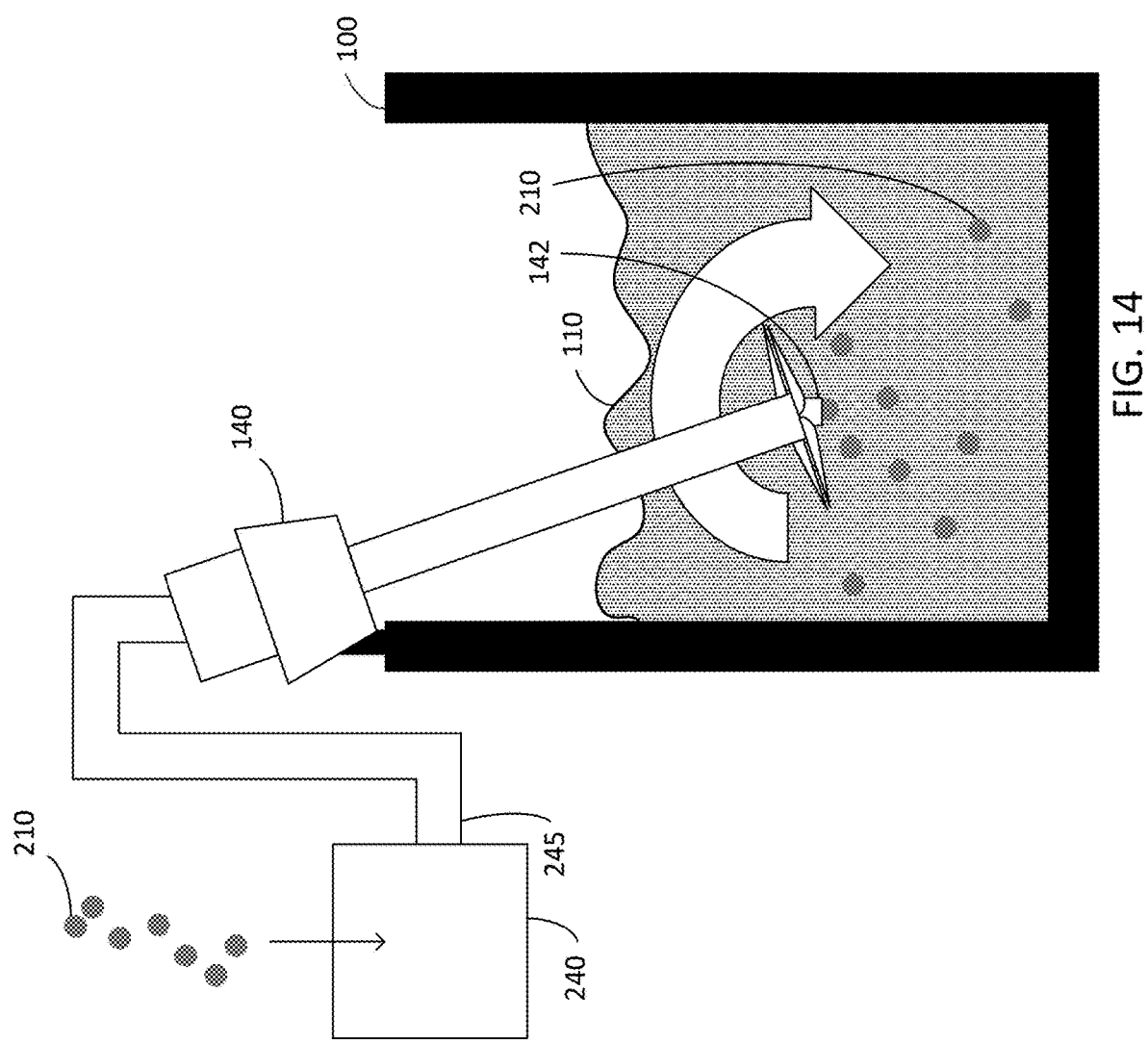
FIG. 14 is a schematic diagram illustrating addition of a selected amount of an LREE precursor compound particles from a hopper through a mechanical stirrer including a stirrer tip injector into a light metal melt.

Advantageously, any of the foregoing embodiments may be used on a large commercial scale. The process may be scaled to produce molten compositions in quantities ranging from a few hundred grams to hundreds of thousands of kilograms. In some embodiments, when the method is performed on a large scale, the LREE precursor compound is introduced into a lower portion of the light metal melt via one or more conduits in a lower portion of the vessel (e.g., as shown in FIG. 13) or via a stirrer tip injector (e.g., as shown in FIG. 14). Solidified compositions made by any of the foregoing embodiments may be subjected to one or more post processing treatments as are known in the art, such as surface hardening, for example.

Figure 17A:
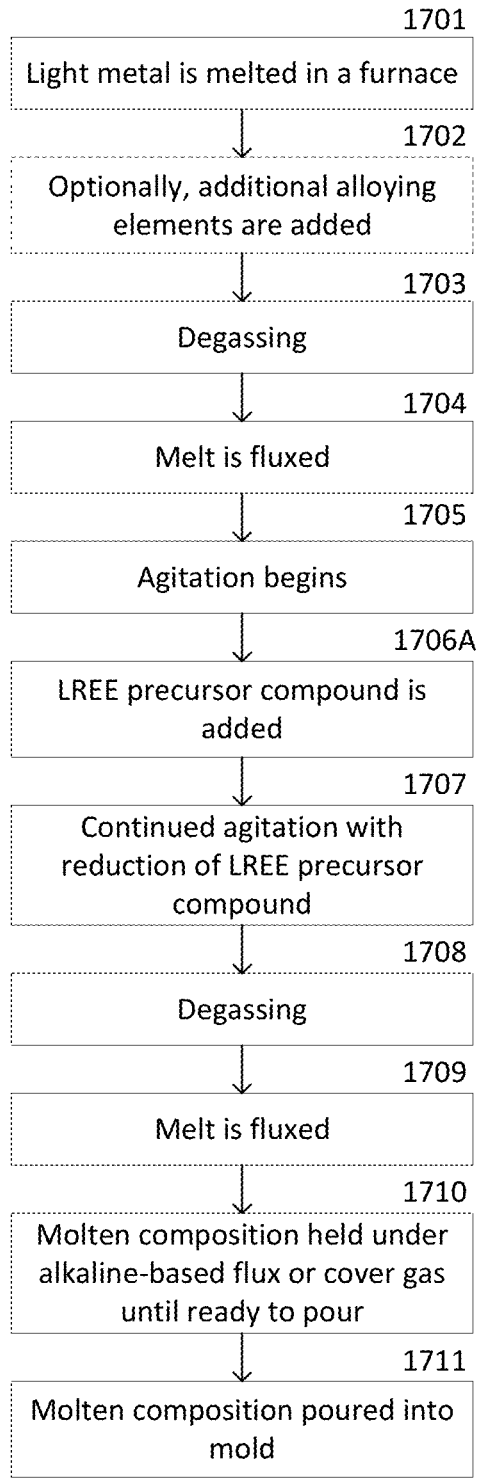
FIGS. 17A and 17B are flow charts comparing one exemplary embodiment of a method for making a light rare earth rich light metal composition (FIG. 17A) to a standard pure metal alloying process (FIG. 17B).
Figure 17B:
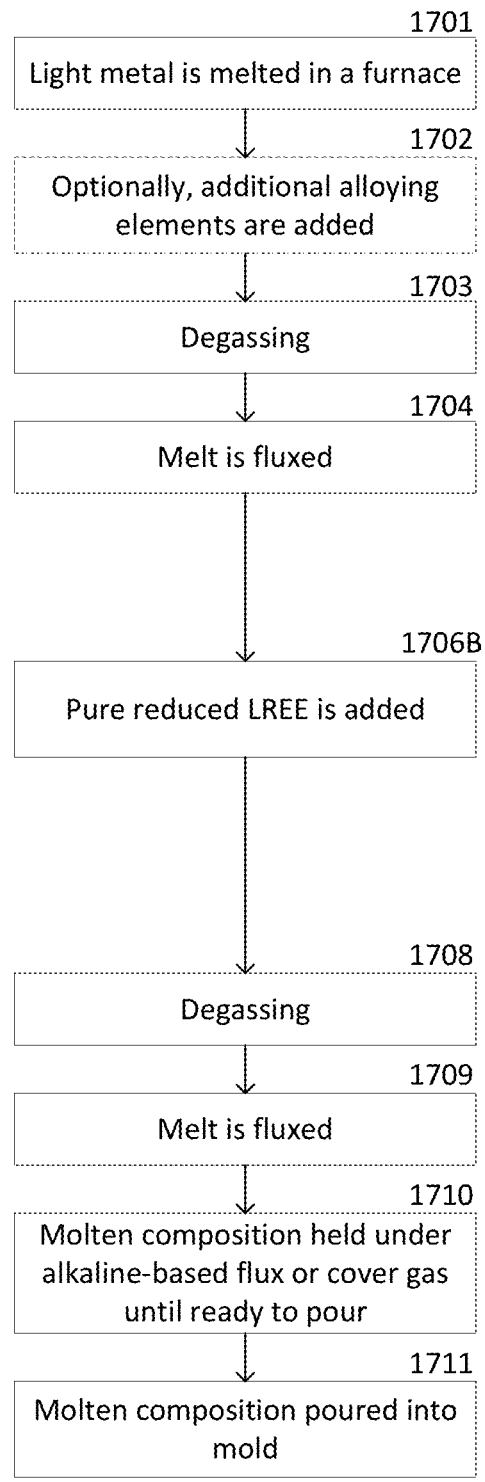

FIGS. 17A and 17B are flow charts comparing one exemplary embodiment of a method for making a light rare earth rich light metal composition (FIG. 17A) to a standard pure metal alloying process (FIG. 17B). In the embodiment of FIG. 17A, a light metal is melted in a furnace (step 1701). Optionally, additional alloying elements are added (step 1702). The melt is degassed (step 1703) and fluxed (step 1704). Continuous agitation begins (step 1705). A selected amount of an LREE precursor compound (e.g., cerium oxide and/or cerium carbonate) is then added to the molten light metal in a single addition or by serial additions of fractions of the selected amount (step 1706A). Agitation is continued with concomitant reduction of the LREE precursor compound (step 1707). The resulting molten composition is degassed (step 1708) and fluxed (step 1709). Degassing and fluxing removes dissolved gases and at least some byproducts, such as larger particles of light metal oxides and/or unreacted LREE precursor compound. For example, when the LREE precursor compound comprises a carbonate, degassing and fluxing removes dissolved $CO_2$. When the LREE precursor compound comprises a hydroxide, degassing and fluxing removes $H_2O$. The molten composition may be held under an alkaline-based flux or cover gas until ready to pour (step 1710). The molten composition is then poured into a mold (step 1711). The standard process in FIG. 17B varies by replacement of steps 1705-1707 with a single step of adding a pure reduced LREE (e.g., cerium metal) to the molten light metal (step 1706B).

Figure 18:
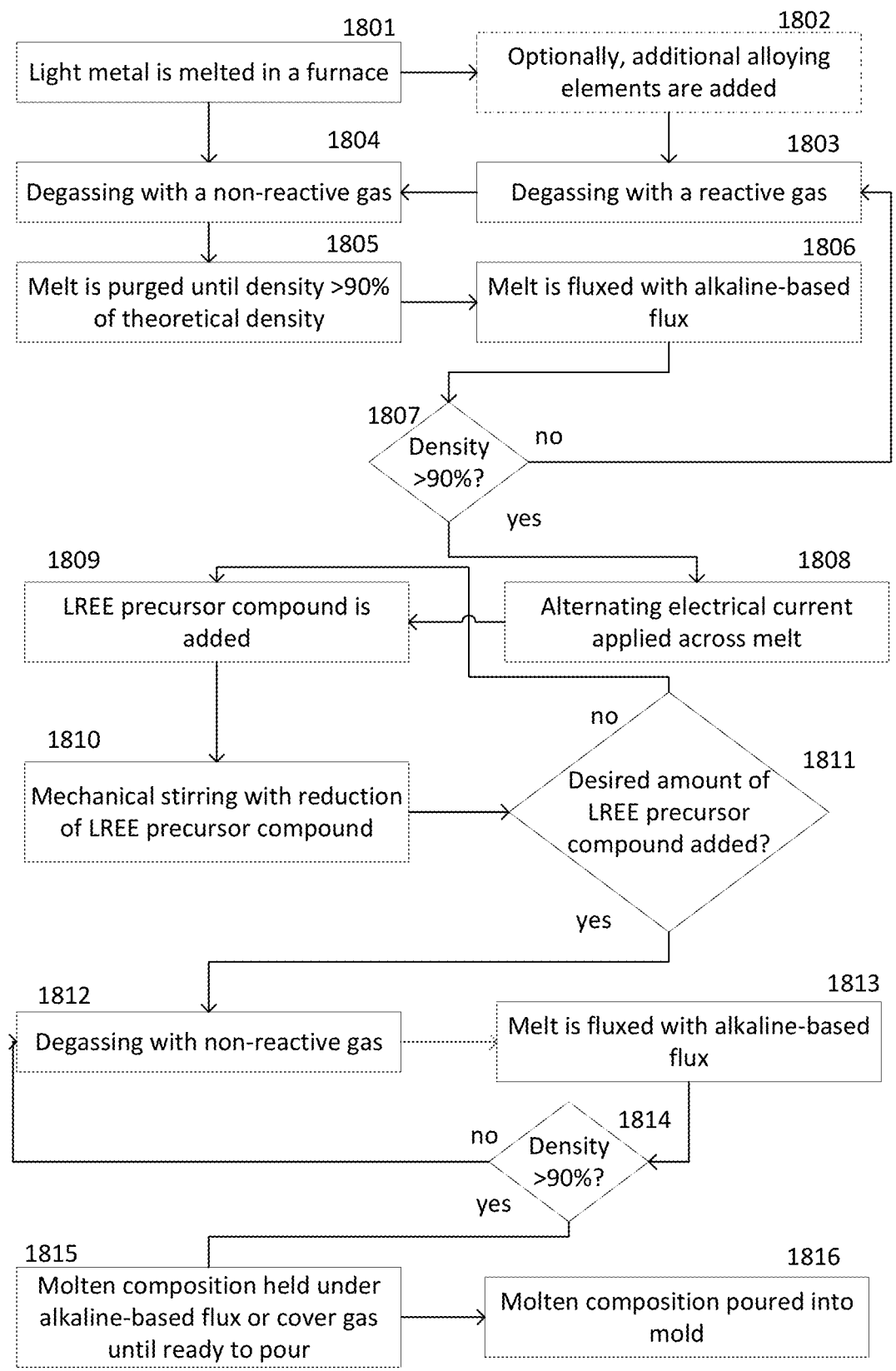
FIG. 18 is a flow chart illustrating one exemplary embodiment of a method for making a light rare earth rich light metal composition using alternating electrical current and mechanical stirring.

Several exemplary, non-limiting variations of the method of FIG. 17A are shown in the flowcharts of FIGS. 18-22. In the embodiment of FIG. 18, a light metal is melted in a furnace (step 1801). Optionally, additional alloying elements are added (step 1802). The molten light metal is degassed with a reactive gas, such as nitrous oxide or chlorine (step 1803), and then degassed with a non-reactive gas, such as argon or nitrogen (step 1804). The melt is purged until the density is >90% of the theoretical density of the melt (step 1805), and is then fluxed with an alkaline-based flux to remove dissolved gases and any undesirable solids (step 1806). The density is measured at step 1807. If the density is not >90% of the theoretical density, steps 1803-1806 are repeated. If the density is >90% of the theoretical density, an alternating electrical current (e.g., an alternating electrical current up to 5 amps) is applied across the melt to initiate agitation (step 1808), and a selected desired amount, or a fraction of the selected amount, of an LREE precursor compound is added (step 1809). In some instances, the LREE precursor compound is added in fractions equivalent to 1 wt % of the final composition. The melt is mechanically stirred with concomitant reduction of the LREE precursor compound (step 1810); optionally application of the alternating current may continue during this step. If the amount of LREE precursor compound added was less than the selected desired amount (step 1811), then steps 1809 and 1810 are repeated. After the desired amount has been added, the molten composition is degassed with a non-reactive gas, such as argon or nitrogen (step 1812) and then fluxed with an alkaline-based flux to removed dissolved gases and undesirable solids (step 1813). The density is measured at step 1814. If the density is not >90% of the theoretical density, steps 1812 and 1813 are repeated. When the density is >90%, the molten composition is held under an alkaline based flux or cover gas until ready to pour (step 1815). The molten composition is then poured into a mold (step 1816).

Figure 19:
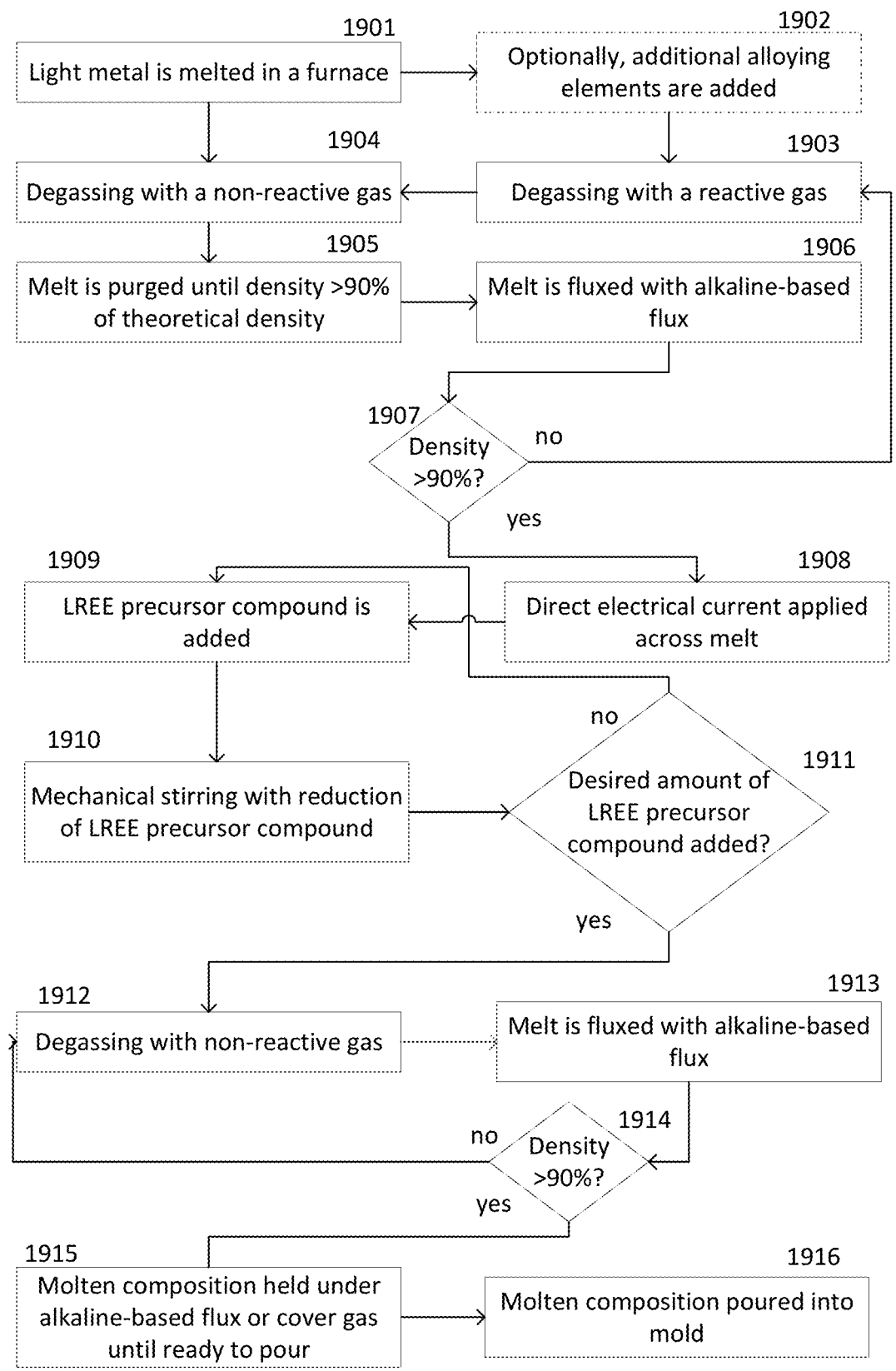
FIG. 19 is a flow chart illustrating one exemplary embodiment of a method for making a light rare earth rich light metal composition using direct electrical current and mechanical stirring.

In the embodiment of FIG. 19, a light metal is melted in a furnace (step 1901). Optionally, additional alloying elements are added (step 1902). The molten light metal is degassed with a reactive gas, such as nitrous oxide or chlorine (step 1903), and then degassed with a non-reactive gas, such as argon or nitrogen (step 1904) The melt is purged until the density is >90% of the theoretical density of the melt (step 1905), and is then fluxed with an alkaline-based flux to remove dissolved gases and any undesirable solids (step 1906). The density is measured at step 1907. If the density is not >90% of the theoretical density, steps 1903-1906 are repeated. If the density is >90% of the theoretical density, a direct electrical current (e.g., a direct electrical current up to 5 amps is applied across the melt to initiate agitation (step 1908), and a selected desired amount, or a fraction of the selected amount, of an LREE precursor compound is added (step 1909). In some instances, the LREE precursor compound is added in fractions equivalent to 1 wt % of the final composition. The melt is mechanically stirred with concomitant reduction of the LREE precursor compound (step 1910); optionally application of the direct current may continue during this step. If the amount of LREE precursor compound added was less than the selected desired amount (step 1911), then steps 1909 and 1910 are repeated. After the desired amount has been added, the molten composition is degassed with a non-reactive gas, such as argon or nitrogen (step 1912) and then fluxed with an alkaline-based flux to removed dissolved gases and undesirable solids (step 1913). The density is measured at step 1914. If the density is not >90% of the theoretical density, steps 1912 and 1913 are repeated. When the density is >90%, the molten composition is held under an alkaline based flux or cover gas until ready to pour (step 1915). The molten composition is then poured into a mold (step 1916).

Figure 20:
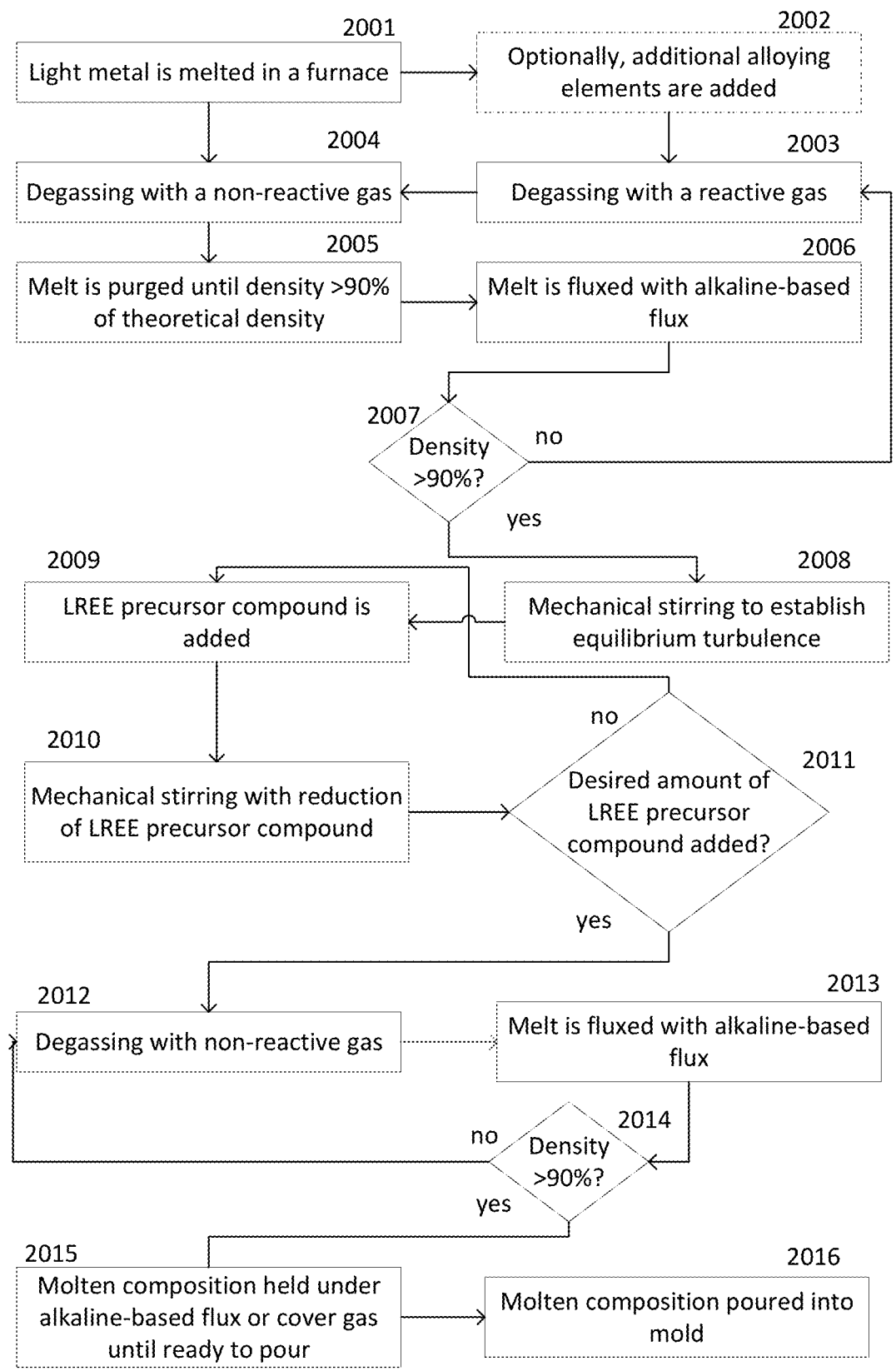
FIG. 20 is a flow chart illustrating one exemplary embodiment of a method for making a light rare earth rich light metal composition using mechanical stirring.

In the embodiment of FIG. 20, a light metal is melted in a furnace (step 2001). Optionally, additional alloying elements are added (step 2002). The molten light metal is degassed with a reactive gas, such as nitrous oxide or chlorine (step 2003), and then degassed with a non-reactive gas, such as argon or nitrogen (step 2004) The melt is purged until the density is >90% of the theoretical density of the melt (step 2005), and is then fluxed with an alkaline-based flux to remove dissolved gases and any undesirable solids (step 2006). The density is measured at step 2007. If the density is not >90% of the theoretical density, steps 2003-2006 are repeated. If the density is >90% of the theoretical density, a mechanical stirrer is lowered into the melt to establish equilibrium turbulence (step 2008); in some instances, mechanical stirring proceeds for two minutes to establish equilibrium turbulence. A selected desired amount, or a fraction of the selected amount, of an LREE precursor compound is added to the melt (step 2009). In some instances, the LREE precursor compound is added in fractions equivalent to 1 wt % of the final composition. The melt is mechanically stirred with concomitant reduction of the LREE precursor compound (step 2010); in some instances, mechanical stirring proceeds for five minutes between additions of the LREE precursor compound. If the amount of LREE precursor compound added was less than the selected desired amount (step 2011), then steps 2009 and 2010 are repeated. After the desired amount has been added, the molten composition is degassed with a non-reactive gas, such as argon or nitrogen (step 2012) and then fluxed with an alkaline-based flux to removed dissolved gases and undesirable solids (step 2013). The density is measured at step 2014. If the density is not >90% of the theoretical density, steps 2012 and 2013 are repeated. When the density is >90%, the molten composition is held under an alkaline based flux or cover gas until ready to pour (step 2015). The molten composition is then poured into a mold (step 2016).

Figure 21:
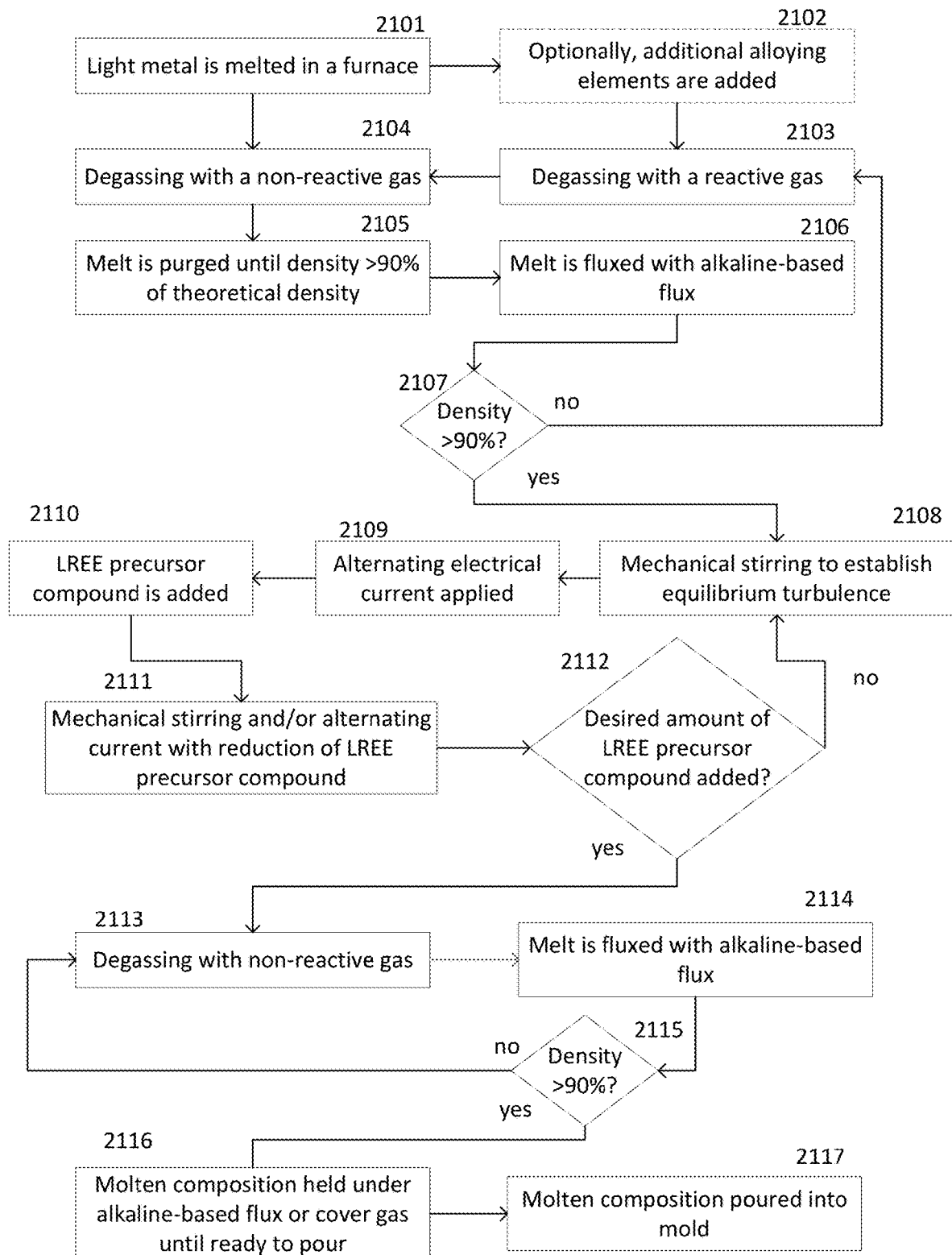
FIG. 21 is a flow chart illustrating another exemplary embodiment of a method for making a light rare earth rich light metal composition using alternating electrical current and mechanical stirring.

In the embodiment of FIG. 21, a light metal is melted in a furnace (step 2101). Optionally, additional alloying elements are added (step 2102). The molten light metal is degassed with a reactive gas, such as nitrous oxide or chlorine (step 2103), and then degassed with a non-reactive gas, such as argon or nitrogen (step 2104) The melt is purged until the density is >90% of the theoretical density of the melt (step 2105), and is then fluxed with an alkaline-based flux to remove dissolved gases and any undesirable solids (step 2106). The density is measured at step 2107. If the density is not >90% of the theoretical density, steps 2103-2106 are repeated. If the density is >90% of the theoretical density, a mechanical stirrer is lowered into the melt to establish equilibrium turbulence (step 2108); in some instances, mechanical stirring proceeds for two minutes to establish equilibrium turbulence. An alternating electrical current (e.g., an alternating electrical current up to 5 amps) is applied across the melt to initiate agitation (step 2109); stirring typically is continued during step 2109. A selected desired amount, or a fraction of the selected amount, of an LREE precursor compound is added to the melt (step 2110). In some instances, the LREE precursor compound is added in fractions equivalent to 1 wt % of the final composition. The melt is mechanically stirred with concomitant reduction of the LREE precursor compound (step 2111); in some instances, mechanical stirring proceeds for up to ten minutes between additions of the LREE precursor compound. Application of the alternating electrical current may continue during step 2111. If the amount of LREE precursor compound added was less than the selected desired amount (step 2112), then steps 2110 and 2111 are repeated. After the desired amount has been added, the molten composition is degassed with a non-reactive gas, such as argon or nitrogen (step 2113) and then fluxed with an alkaline-based flux to removed dissolved gases and undesirable solids (step 2114). The density is measured at step 2115. If the density is not >90% of the theoretical density, steps 2113 and 2114 are repeated. When the density is >90%, the molten composition is held under an alkaline based flux or cover gas until ready to pour (step 2116). The molten composition is then poured into a mold (step 2117).

Figure 22:
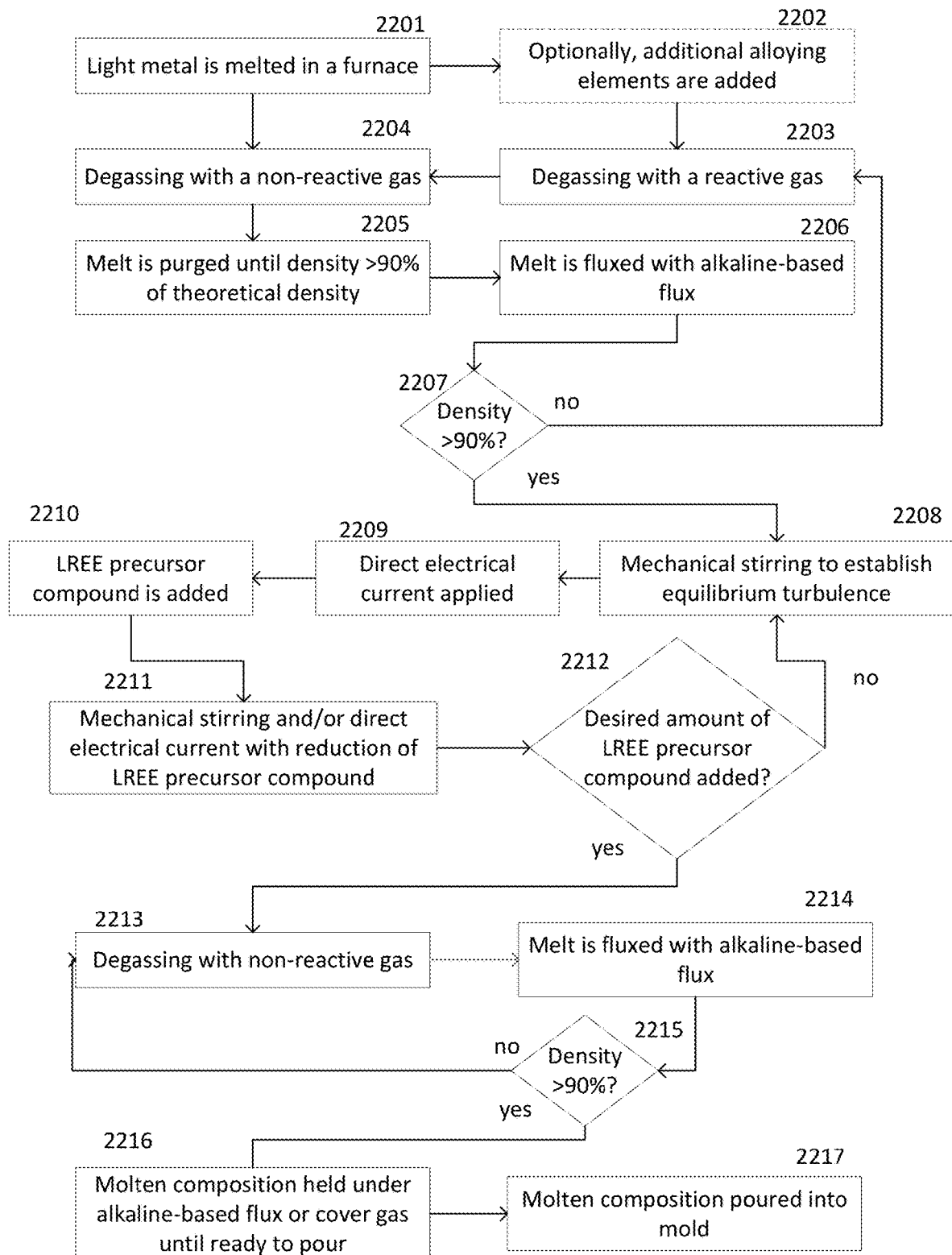
FIG. 22 is a flow chart illustrating another exemplary embodiment of a method for making a light rare earth rich light metal composition using direct electrical current and mechanical stirring.

In the embodiment of FIG. 22, a light metal is melted in a furnace (step 2201). Optionally, additional alloying elements are added (step 2202). The molten light metal is degassed with a reactive gas, such as nitrous oxide or chlorine (step 2203), and then degassed with a non-reactive gas, such as argon or nitrogen (step 2204) The melt is purged until the density is >90% of the theoretical density of the melt (step 2205), and is then fluxed with an alkaline-based flux to remove dissolved gases and any undesirable solids (step 2206). The density is measured at step 2207. If the density is not >90% of the theoretical density, steps 2203-2206 are repeated. If the density is >90% of the theoretical density, a mechanical stirrer is lowered into the melt to establish equilibrium turbulence (step 2208); in some instances, mechanical stirring proceeds for two minutes to establish equilibrium turbulence. A direct electrical current (e.g., a direct electrical current up to 5 amps) is applied across the melt (step 2209); stirring typically is continued during step 2209. A selected desired amount, or a fraction of the selected amount, of an LREE precursor compound is added to the melt (step 2210). In some instances, the LREE precursor compound is added in fractions equivalent to 1 wt % of the final composition. The melt is mechanically stirred with concomitant reduction of the LREE precursor compound (step 2211); in some instances, mechanical stirring proceeds for up to ten minutes between additions of the LREE precursor compound. Application of direct electrical current may continue during step 2211. If the amount of LREE precursor compound added was less than the selected desired amount (step 2212), then steps 2210 and 2211 are repeated. After the desired amount has been added, the molten composition is degassed with a non-reactive gas, such as argon or nitrogen (step 2213) and then fluxed with an alkaline-based flux to removed dissolved gases and undesirable solids (step 2214). The density is measured at step 2215. If the density is not >90% of the theoretical density, steps 2213 and 2214 are repeated. When the density is >90%, the molten composition is held under an alkaline based flux or cover gas until ready to pour (step 2216). The molten composition is then poured into a mold (step 2217).

In any of the foregoing embodiments, the final steps of degassing and fluxing may be omitted. However, the composition will include reaction by-products, such as particles of light metal oxides and/or unreacted LREE precursor compound. As previously discussed, in some embodiments, degassing and fluxing may remove larger particles, such as microparticles, while leaving smaller particles, such as nanoparticles, in the final composition.

In any of the foregoing embodiments, the casting process may be gravity-fed casting, die-casting, direct-chill casting, low pressure casting, squeeze casting, or any other casting technique. In any of the foregoing embodiments, if reaction by products are removed, the compositions formed are structurally and functionally equivalent to identical alloys produced by conventional means.

In any of the foregoing embodiments the molten composition is a solution of pure reduced LREE, a light metal, and any other alloying elements. In some embodiments, the molten composition further comprises particles of light metal oxides and/or unreacted LREE compound. FIGS. 23-24 include several exemplary chemical equations for preparation of the molten compositions. The equations show the presence of light metal oxides, but assume that all LREE precursor compound has reacted. Upon solidification, the material will form one or more intermetallic compounds from the pure reduced LREE and a matrix material (the light metal and any other alloying elements) as discussed in further detail below. The material may further include particles of light metal oxides and/or unreacted LREE compound.

III. LIGHT RARE EARTH RICH LIGHT METAL COMPOSITIONS

In some embodiments, compositions made by the methods disclosed herein comprise (i) an alloy comprising (a) a light metal, and (b) an intermetallic comprising the light metal and the light rare earth element (LFREE), the LREE comprising cerium (Ce), lanthanum (La), mischmetal, or any combination thereof; and (ii) 0.01% (v/v) to 10% (v/v) of a plurality of particles comprising an oxide of the light metal. The particles are dispersed in the composition, preferably throughout the composition. In certain embodiments, the particles are homogeneously dispersed throughout the composition. Homogeneity may be qualitatively assessed by imaging techniques, such as SEM and/or TEM imaging. In some embodiments, the particles are nanoparticles.

In some embodiments, the LREE comprises Ce, La, or a combination thereof. In certain embodiments, the LREE comprises, consists essentially of, or consists of Ce.

In any of the foregoing embodiments, the light metal may comprise aluminum, magnesium, or a combination thereof. When the light metal comprises aluminum, the alloy comprises aluminum and an intermetallic comprising Al and the LREE. For example, when the LREE is Ce, the alloy may comprise an Al/Ce intermetallic, such as $Al_{11}Ce_3$. When the light metal comprises magnesium, the alloy comprises magnesium and the LREE. The LREE may be present as an intermetallic formed with the Mg, such as $Mg_3Ce$ and $Mg_{3.6}Ce$. When the light metal comprises a combination of aluminum and magnesium, an aluminum/magnesium/LREE alloy is formed. Intermetallics of Al/Ce, Al/Ce/Mg, Al/Mg, and/or Mg/Ce also may be present.

In any of the foregoing embodiments, the alloy may further include additional alloying elements. Additional alloying elements include, but are not limited to silicon, zirconium, manganese, zinc, iron, nickel, copper, or any combination thereof. Most commonly, silicon may be added to the alloy. When silicon is present and the light metal is aluminum, the alloy comprises aluminum/silicon, and Al/LREE intermetallics, such as $Al_{11}Ce_3$. When silicon is present and the light metal is magnesium, the alloy comprises magnesium/silicon, and Mg/LREE intermetallics, such as $Mg_3Ce$ and $Mg_{3.6}Ce$. When silicon is present and the light metal comprises aluminum and magnesium, the alloy comprises aluminum/magnesium/silicon, and intermetallics of Al/LREE, Al/LREE/Mg, and/or Mg/LREE.

In any of the foregoing embodiments, the composition may comprise from 2 wt % to 60 wt % of the light rare earth element. In some embodiments, the composition comprises 2-40 wt % or 2-20 wt % of the LREE.

The light metal oxide particles may have an average size within a range of 10 nm to 500 μm, such as an average size of 10 nm to 30 μm, 10 nm to 1 μm, 10-500 nm, 10-250 nm, 50-250 nm, or 10-100 nm. In one embodiment, the light metal is aluminum, and the particles comprise $Al_2O_3$. In another embodiment, the light metal is magnesium, and the particles comprise MgO. In another embodiment, the light metal comprises a combination of aluminum and magnesium, and the particles comprise a combination of $Al_2O_3$ and MgO; in some cases, the particles may further comprise $MgAl_2O_4$.

Although a majority of light metal oxide particles formed during the direct reduction reaction may be removed by degassing, some of the particles, particularly nanoparticles, may remain in the composition. Thus, in any of the foregoing embodiments, the composition may comprise from 0.01% (v/v) to 10% (v/v) of light metal oxide particles, as determined by scanning electron microscopy (SEM) and/or transmission electron microscopy (TEM) imaging. The light metal oxide particles are visible by SEM and/or TEM imaging, and the SEM and/or TEM image may be evaluated to determine an approximate volume of particles per unit volume of the composition. In some embodiments, the composition comprises 0.01-5% (v/v), 0.1-5% (v/v), 0.1-3% (v/v), or 0.1-2% (v/v) light metal oxide particles. In certain embodiments, the particles are nanoparticles, such as nanoparticles having an average size within a range of from 10-500 nm, 10-250 nm, 50-250 nm, or 10-100 nm.

The presence of light oxide particles produces a metal matrix composite (MMC). MMCs can exhibit a number of useful properties, such as creep resistance and/or a lower coefficient of thermal expansion compared to a traditional alloy. MMCs also offer more flexibility in properties, since the MMC is not limited by the thermodynamic limits of alloys like precipitate volume fraction, maximum solubility, or the like. In the particular case of aluminum alloys reinforced with oxide particles, high temperature properties and stability can be greatly enhanced because the oxide particles do not coarsen like strengthening precipitates intrinsic to the alloy do. While this can be useful for alloys reinforced with particles greater than 1 μm in diameter, larger particles in the structure can have a negative impact on ductility and fatigue life.

Reinforcement with nanoparticles less than 100 nm in diameter may provide similar strengthening effects as thermodynamic precipitates, but without some of the drawbacks of larger particles. However, processing these metal matrix nanocomposites (MMNCs) in the liquid phase (where oxide or other ceramic powder is added directly to the liquid) is typically very challenging, as the particles do not disperse well in the melt due to a combination of poor wetting and small size limiting shear forces. If the particles are clustered together in the final structure, not only do they not provide optimal particulate strengthening, they also serve as a detrimental defect and crack initiation site. One option to improve wetting is the formation of particles in situ, that is, forming solid particles in the melt by a chemical reaction. In some embodiments, aluminothermic and/or magnesiothermic reaction of LREE precursor compounds with the Al, Mg, or Al/Mg melt creates reaction products that are of a useful size to create MMCs or MMNCs. If the reaction is controlled to create nanoparticles having a size less than 100 nm, resulting alloy properties may be enhanced. In some embodiments, a MMNC produced by embodiments of the disclosed method has greater than 0.01% (v/v) light metal oxide nanoparticles, such as 0.01-10% (v/v), 0.1-5% (v/v), 0.1-2% (v/v) or 0.5-2% (v/v) light metal oxide nanoparticles.

In any of the foregoing embodiments, the composition may further comprise particles of an unreacted LREE precursor compound comprising the LREE. In some embodiments, the unreacted LREE precursor compound particles are nanoparticles having an average size within a range of from 10 nm to 500 μm, such as an average size of 10 nm to 30 μm, 10 nm to 1 μm, 10-500 nm, 10-250 nm, 50-250 nm, or 10-100 nm. The unreacted LREE precursor compound particles may be dispersed throughout the composition. In some embodiments, the unreacted LREE precursor compound particles are homogeneously dispersed throughout the composition. In certain embodiments, the unreacted LREE precursor compound particles are nanoparticles, such as nanoparticles having an average size within a range of from 10-500 nm, 10-250 nm, 50-250 nm, or 10-100 nm. In any of the foregoing embodiments, the composition may comprise from 0.1% to 50% of the added amount of LREE precursor compound powder as unreacted LREE precursor compound particles. In some embodiments, the composition comprises 0.1-40%, 0.1-30%, 0.1-25%, 0.1-20%, 0.1-15%, or 0.1-10% of the input powder as unreacted LREE precursor compound particles. In any of the foregoing embodiments, the composition may comprise from 0.01 vol % to 5.0 vol % of unreacted LREE precursor compound particles, such as from 0.01-1 vol % or 0.01-0.5 vol %. In some examples, the LREE comprises cerium, and the unreacted LREE precursor compound comprises cerium oxide, cerium carbonate, or a combination thereof.

IV. REPRESENTATIVE EMBODIMENTS

Certain representative embodiments are exemplified in the following numbered clauses.

1. A composition, comprising: an alloy comprising (i) a light metal comprising aluminum, magnesium, or a combination thereof, and (ii) an intermetallic comprising the light metal and a light rare earth element, the light rare earth element comprising cerium, lanthanum, mischmetal, or any combination thereof; and 0.01% (v/v) to 10% (v/v) of a plurality of nanoparticles comprising an oxide of the light metal.

2. The composition of clause 1, wherein the nanoparticles have an average size within a range of 10 nm to 500 nm.

3. The composition of clause 1 or clause 2, wherein: (i) the light metal comprises aluminum, and the nanoparticles comprise aluminum oxide; or (ii) the light metal comprises magnesium, and the nanoparticles comprise magnesium oxide; or (iii) the light metal comprises a combination of aluminum and magnesium, and the nanoparticles comprise combination of aluminum oxide, magnesium oxide, or magnesium aluminate, or any combination thereof.

4. The composition of any one of clauses 1-3, wherein the composition comprises 2 wt % to 60 wt % of the light rare earth element.

5. The composition of clause 4, wherein the composition comprises 2 wt % to 40 wt % of the light rare earth element.

6. The composition of any one of clauses 1-6, wherein the light rare earth element comprises cerium.

7. The composition of any one of clauses 1-6, wherein the alloy further comprises silicon, zirconium, manganese, zinc, iron, nickel, copper, or any combination thereof.

8. The composition of clause 7, wherein the alloy further comprises silicon.

9. The composition of any one of clauses 1-8, further comprising particles of an unreacted light rare earth element precursor compound comprising the light rare earth element.

10. The composition of clause 9, wherein the composition comprises 0.01-5 vol % particles of the unreacted light rare earth element precursor compound.

11. The composition of clause 9 or clause 10, wherein the light rare earth element comprises cerium, and the unreacted light rare earth element precursor compound comprises cerium oxide, cerium carbonate, cerium hydroxide, or any combination thereof.

12. The composition of any one of clauses 1-11, wherein the nanoparticles are dispersed throughout the composition, particularly wherein the nanoparticles are homogeneously dispersed throughout the composition.

13. A method of making a composition, comprising: melting a light metal to form a melt, the light metal comprising aluminum, magnesium, or a combination thereof; agitating the melt to produce a vortex, an eddy current, cavitation, charge buildup, or any combination thereof within the melt; adding a powder comprising a light rare earth element precursor compound to the melt while agitating the melt to reduce at least a portion of the light rare earth element precursor compound and form a molten composition comprising the light metal, the light rare earth element, and particles comprising an oxide of the light metal, the light rare earth element comprising cerium, lanthanum, mischmetal, or any combination thereof; and cooling the molten composition to produce a composition comprising (i) an alloy of the light metal and an intermetallic comprising the light metal and the light rare earth element, and (ii) the particles comprising the oxide of the light metal.

14. The method of clause 13, wherein agitating the melt comprises: (i) mechanically or magnetically stirring the melt; or (ii) ultrasonication of the melt; or (iii) application of a direct or alternating electrical current through the melt; or (iv) any combination of (i), (ii), and (iii).

15. The method of clause 13 or clause 14, wherein adding the powder comprising the light rare earth element precursor compound to the melt comprises adding the powder below an upper surface of the melt.

16. The method of clause 15, wherein adding the powder comprising the light rare earth element precursor compound to the melt further comprises: fluidizing the powder with a gas to provide a fluidized powder; and injecting the fluidized powder into the melt below an upper surface of the melt.

17. The method of clause 13 or clause 14, wherein adding the powder comprising the light rare earth element precursor compound to the melt comprises adding a packet to the melt, the packet comprising the powder wrapped in a foil comprising the light metal.

18. The method of any one of clauses 13-17, wherein adding the powder comprising the light rare earth element precursor compound comprises: selecting an amount of the powder comprising the light rare earth element precursor compound; and serially adding fractions of the selected amount of the powder comprising the light rare earth element precursor compound to the melt at intervals while agitating the melt until all of the selected amount has been added.

19. The method of clause 18, wherein the intervals range from 5 seconds to 1 hour.

20. The method of clause 18 or clause 19, wherein serially adding fractions of the selected amount of the powder comprising the light rare earth element precursor compound to the melt at intervals further comprises: (a) adding a fraction of the selected amount; (b) agitating the melt for a period of time to reduce at least some of the first fraction; (c) adding a subsequent fraction of the selected amount; (d) agitating the melt for a subsequent period of time to reduce at least some of the subsequent fraction; and (e) repeating steps (c) and (d) until all of the selected amount has been added.

21. The method of clause 20, wherein each of the period of time and the subsequent period of time independently ranges from 5 minutes to 10 hours.

22. The method of any one of clauses 13-21, wherein the light rare earth element precursor compound comprises an oxide, a carbonate, a hydroxide, a chloride, a chlorite, a perchlorate, a fluoride, a fluorite, an oxalate, a sulfide, a sulfate, a sulfite, a phosphide, a phosphate, or any combination thereof of the light rare earth element.

23. The method of any one of clauses 13-22, wherein the light rare earth element precursor compound comprises cerium oxide, cerium carbonate, cerium hydroxide, or any combination thereof.

24. The method of any one of clauses 13-23, wherein: (i) the method further comprises removing at least some of the particles comprising the oxide of the light metal from the molten composition before cooling the molten composition; or (ii) the molten composition further comprises particles comprising unreacted light rare-earth element precursor compound, the method further comprising removing at least some of the particles comprising unreacted light rare-earth element precursor compound from the molten composition before cooling the molten composition; or (iii) both (i) and (ii).

25. The method of clause 24, wherein removing at least some of the particles comprising the oxide of the light metal or at least some of the particles comprising unreacted light rare earth element precursor compound comprises: passing gas bubbles through the molten composition, whereby solid particles within the molten composition are conveyed by the gas bubbles to an upper surface of the molten composition, the solid particles comprising the particles comprising the oxide of the light metal, the particles comprising unreacted light rare earth element precursor compound, or both; and removing the solid particles from the upper surface of the molten composition.

26. The method of clause 25, wherein the gas bubbles comprise nitrous oxide, chlorine, nitrogen, or argon.

27. The method of any one of clauses 13-26, wherein the method is a continuous or semi-continuous method, the method further comprising: continuously adding light metal or serially adding amounts of the light metal to the melt at intervals with continuous agitation; continuously adding powder comprising the light rare earth element precursor compound or serially adding amounts of the powder comprising the light rare earth element precursor compound to the melt at intervals with continuous agitation; continuously transferring molten composition to a die caster or serially transferring portions of the molten composition at intervals to the die caster; transferring molten composition from the die caster to a series of molds; and cooling the molten composition in the molds to produce the composition.

28. A composition made by the method of any one of clauses 13-27.

V. EXAMPLES

Exemplary compositions comprising light metals and LREEs were prepared by embodiments of the disclosed method using LREE precursor compounds. In the following compositions, the numbers indicate percent by weight. Thus, Al-8Ce-10Mg, for example, indicates a composition comprising 8 wt % Ce and 10 wt % Mg, with the balance being Al.

Figure 25B:
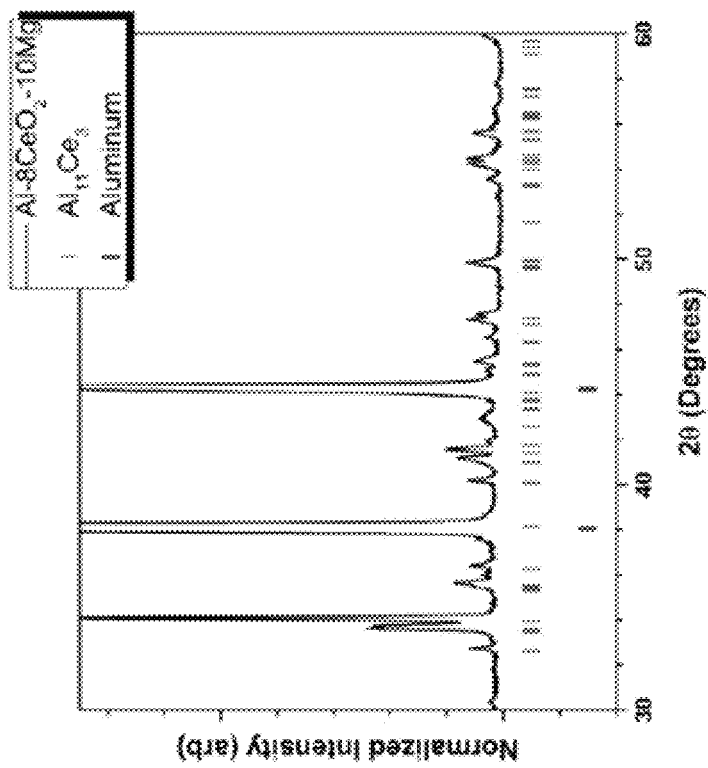
FIGS. 25A and 25B are X-ray diffraction (XRD) scans of compositions prepared from Al-4CeO$_2$-10Mg (25A) and Al-8CeO$_2$-10Mg (25B) (by weight).
Figure 25A:
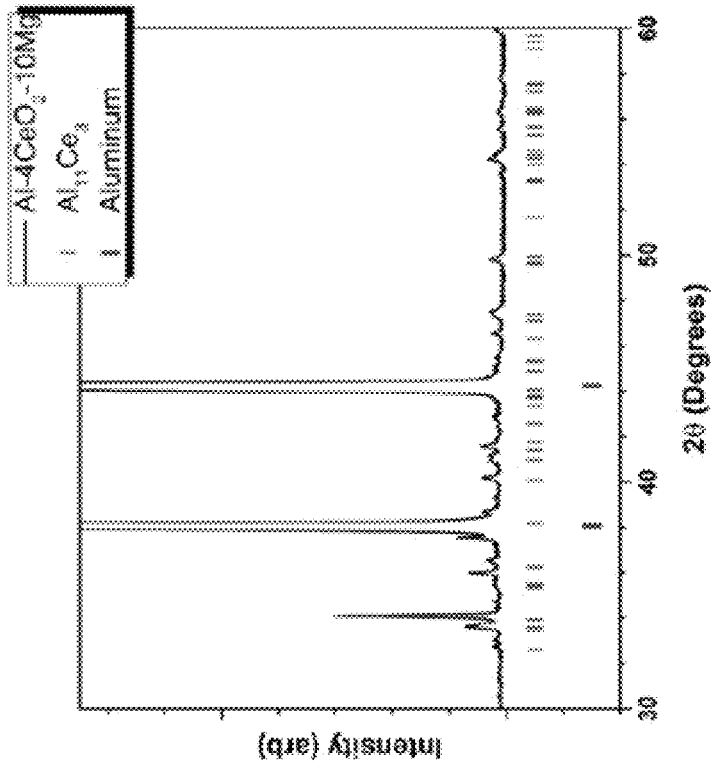
Figure 26B:
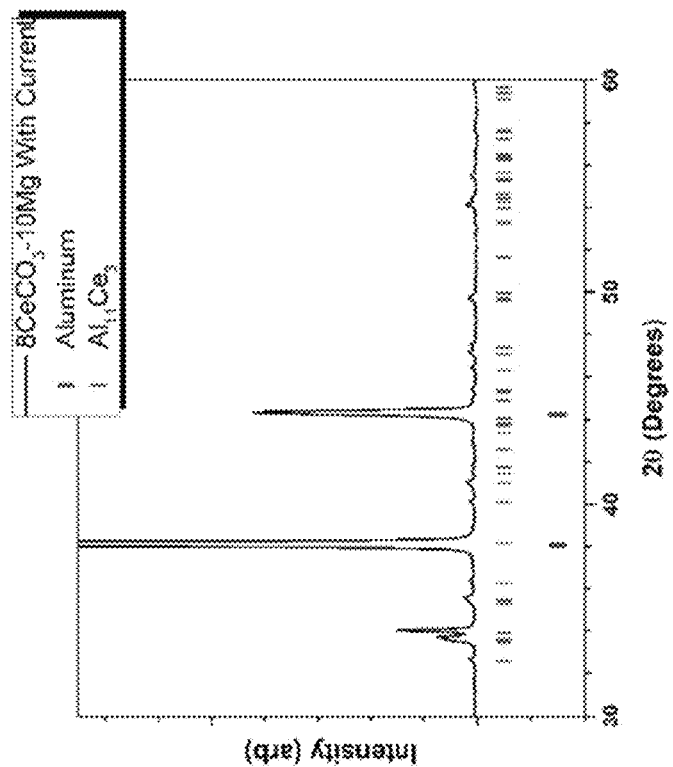
FIGS. 26A and 26B are XRD scans of Al-8CeO$_2$-10Mg compositions prepared without (FIG. 26A) and with (FIG. 26B) application of an electrical current during the direct reduction process.
Figure 26A:
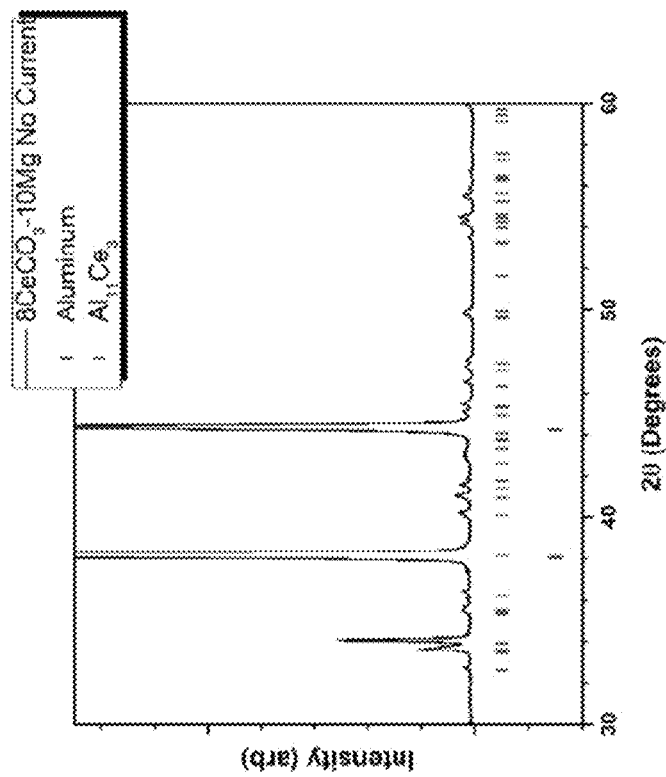

Compositions comprising Al-4$CeO_2$-10Mg or Al-8$CeO_2$-10Mg were prepared as follows. The molten compositions were cast in a 40 lb. tilt crucible furnace equipped with a pneumatic stirring rod. Pure aluminum ingot was melted, after which pure magnesium was added up to 10 wt. %. Then the samples were agitated to form a vortex by the stirring rod, after which $CeO_2$ was added to the melt in ~2 wt. % increments. Test ingots were cast, cooled, and evaluated by X-ray diffraction (XRD). The XRD scans show successful reduction of $CeO_2$ in the Al-4$CeO_2$-10Mg (FIG. 25A) and Al-8$CeO_2$-10Mg (FIG. 25B) compositions. In each scan, peaks aligned with the lower tick marks along the x-axis result from aluminum and peaks aligned with the upper tick marks result from $Al_{11}Ce_3$ intermetallics. Compositions comprising Al-8$CeO_2$-10Mg were prepared as described above, with and without application of a 2.5-amp electrical direct current to the melt during the reduction process; the mixing head acted as the anode and a conductive rod was placed on the side of the melt. The molten compositions were cast, cooled, and evaluated by XRD. FIGS. 26A and 26B are XRD scans of the compositions prepared without (FIG. 26A) and with (FIG. 26B) application of electrical current. The analysis clearly shows peaks belonging to the expected $Al_{11}Ce_3$ phase. The weight percent mixture of the phases was within the expected range from calculations (~3 wt % for 4 wt % oxide addition and ~7-8 wt % for the 8% addition), further confirming a complete cerium oxide reduction. As shown in FIGS. 26A-26B, application of current had no measurable effect on phase fraction, but affected microstructure. The sample with no current (FIG. 26A) showed measurable reduction but included unaccounted for peaks, likely resulting from unreacted precursor compound particles and possible intermediate reaction products. Application of current (FIG. 26B) appeared to increase effectiveness of the reduction reaction as seen through higher intensity peaks of $Al_{11}Ce_3$ and fewer unaccounted for peaks in the XRD scan.

Scanning electron microscopy (SEM) imaging and spectroscopy techniques were additionally used to confirm reduction of the precursor compounds. In the case of direct reduction samples, a direct comparison between the morphology of eutectic colonies present in both the traditionally processed alloy samples and directed reduction processed (using carbonate and oxide precursor compounds) alloys shows very similar morphological characteristics. FIGS. 27A and 27B are SEM images of eutectic colonies taken from an Al-8Ce-10Mg alloy prepared using a traditional process (FIG. 27A) and an Al-6Ce-10Mg composition prepared using an embodiment of the disclosed method as described above with a cerium carbonate precursor and using 2.5 amps direct current (FIG. 27B). The fishbone structure of the eutectic colonies, high Z contrast in back scatter, dendrite arm spacing, and dendrite arm length were similar across both alloys, demonstrating that the direct reduction process does not have a marked effect on the solidification process and resulting microstructure.

However, compositions produced by a direct production process as disclosed herein may include unreacted LREE precursor compounds and/or reaction products. FIG. 28 is an SEM image showing a eutectic $Al_{11}Ce_3$ colony present in an Al-10Mg-8 wt % Ce carbonate composition prepared by an embodiment of the disclosed method as disclosed above using a cerium carbonate precursor; no current was applied. The boxes in FIG. 28 highlight regions where unreacted LREE precursor compound or reaction products (e.g., light metal oxide) have not been completely removed. These products are not seen in alloys produced by traditional methods when equivalent processing steps are taken.

Figure 29A:
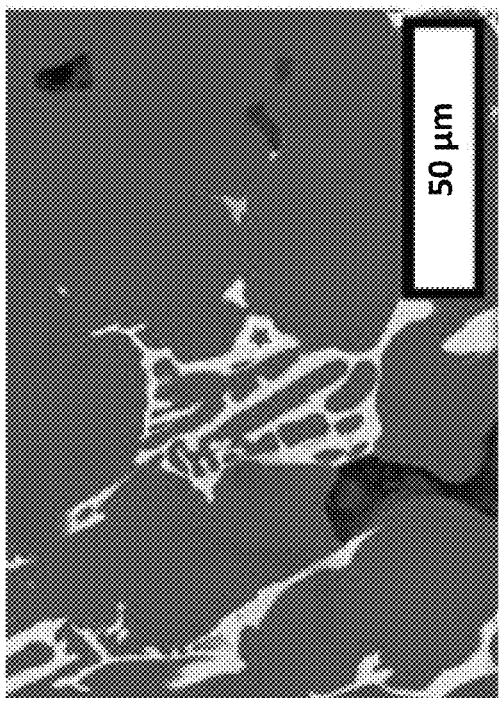
FIGS. 29A and 29B are SEM images showing matrix and eutectic colonies of Al-10Mg-8 wt % Ce carbonate compositions prepared by an embodiment of the disclosed method using a cerium carbonate precursor.
Figure 29B:

FIGS. 29A and 29B are SEM images of matrix and eutectic $Al_{11}Ce_3$ colonies in Al-10Mg-8 wt % Ce carbonate compositions produced by direct reduction as described above using a carbonate precursor compound and 2.5 amps of current. Energy dispersive X-ray spectroscopy (EDS) was used to confirm the compositions of the matrix and eutectic colonies at the regions indicated by stars in FIGS. 29A and 29B. Table 1 shows the compositions of each of these locations, confirming them as colonies of $Al_{11}Ce_3$ crystals. These colonies were found throughout the samples, lending to the conclusion that a nearly complete reduction reaction occurred.

TABLE 1

| Site | Al (at %) | Ce (at %) | Mg (at %) |
|---|---|---|---|
| 1 | 74.4 | 25.8 | 0 |
| 2 | 76.5 | 22.7 | 0.8 |

Figure 30:
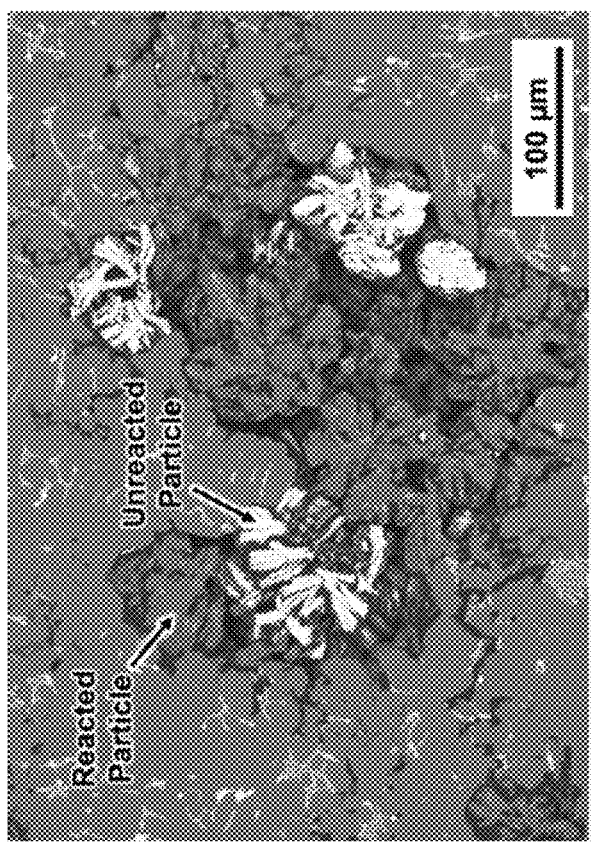
FIG. 30 is an SEM image, taken in backscatter electron mode, of an Al-10Mg-8 wt % Ce carbonate composition including partially reacted carbonate precursor particles.
Figures 31A, 31B, 31C, 31D, 31E, 31F, 31G:
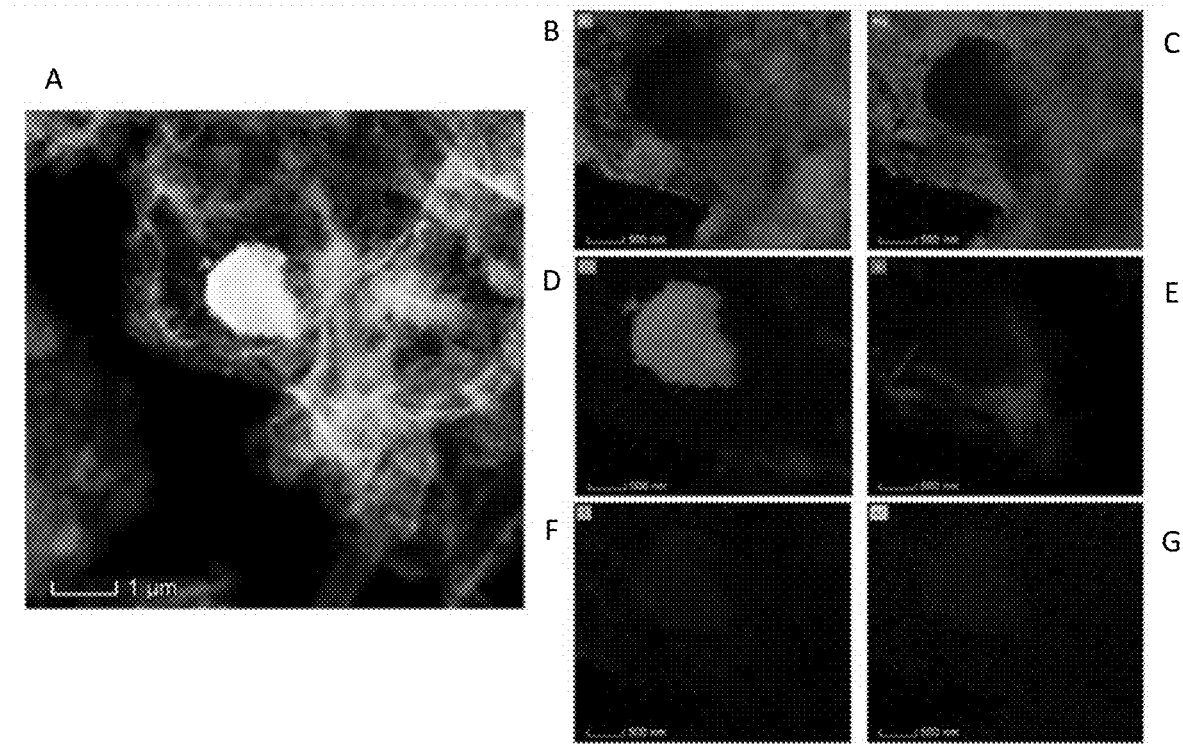
FIGS. 31A-31G are a TEM image (31A) and electronic dispersive spectroscopy (EDS) elemental maps of a region taken from an Al-10Mg-8 wt % Ce carbonate composition produced with a carbonate precursor compound showing presence of aluminum (31B) and magnesium (31C) surrounding a central particle rich in cerium (31D) and contaminants from the precursor compound, including potassium (31E), chlorine (31F), and gadolinium (31G).
Figures 32A, 32B, 32C, 32D, 32E, 32F, 32G, 32H, 32I:
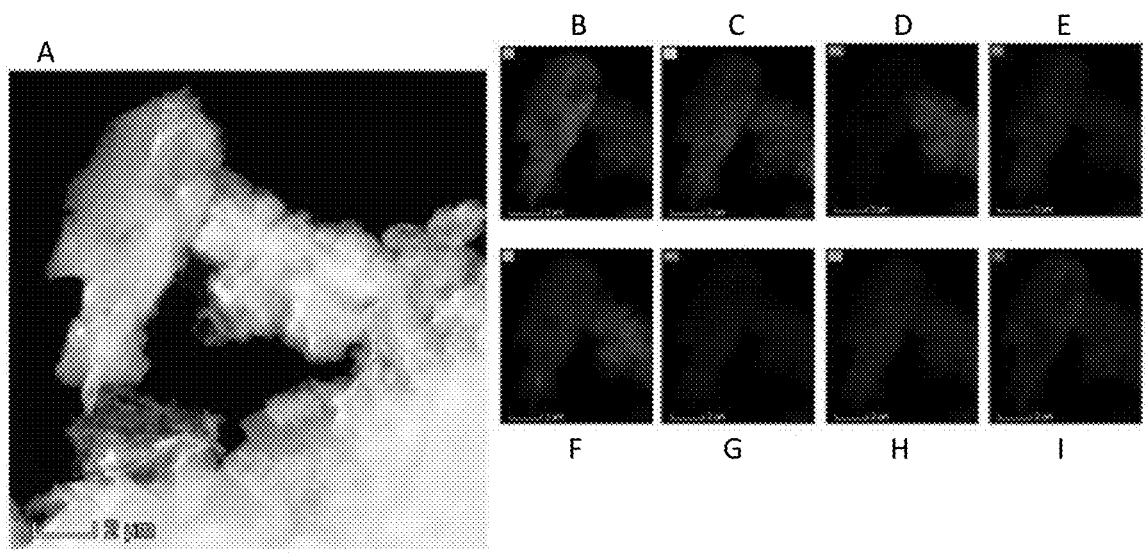
FIGS. 32A-32I are a TEM image (32A) and EDS elemental maps of a region taken from an Al-10Mg-8 wt % Ce carbonate composition produced with a carbonate precursor compound showing presence of aluminum (32B), cerium (32C), magnesium (32D), iron (32E), chlorine (32F), molybdenum (32G), gadolinium (32H) and fluorine (32I).
Figures 33A, 33B, 33C, 33D, 33E, 33F, 33G:
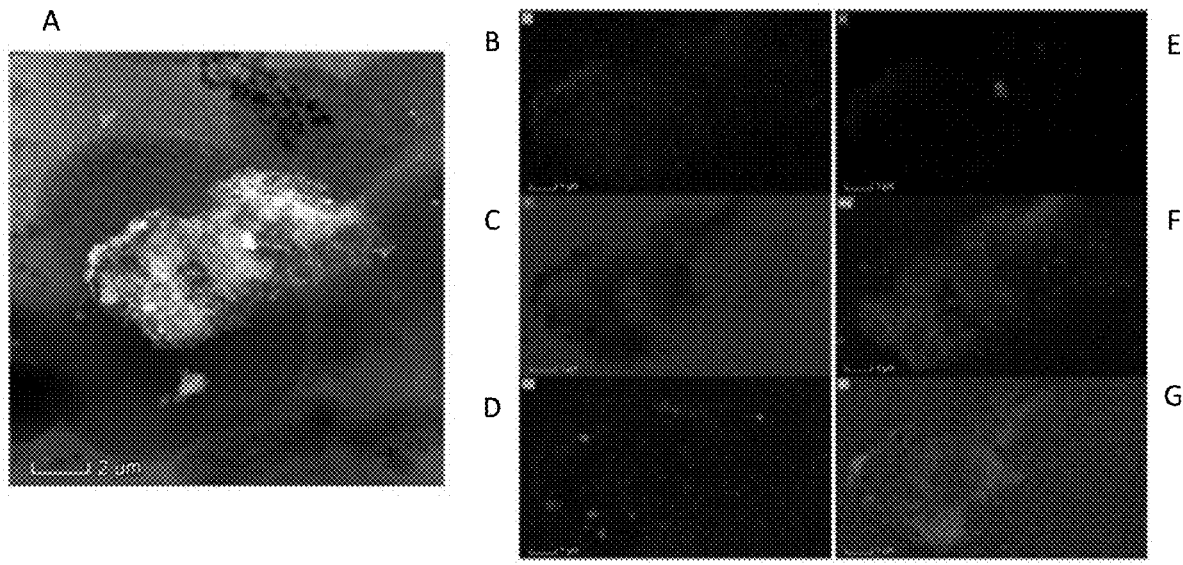
FIGS. 33A-33G are a TEM image (33A) and EDS elemental maps of an aluminum and magnesium rich region of an Al-10Mg-8 wt % Ce carbonate composition showing presence of chlorine (33B), fluorine (33C), cerium (33D), silicon (33E), magnesium (33F), and aluminum (33G).
Figures 34A, 34B, 34C, 34D, 34E, 34F, 34G:
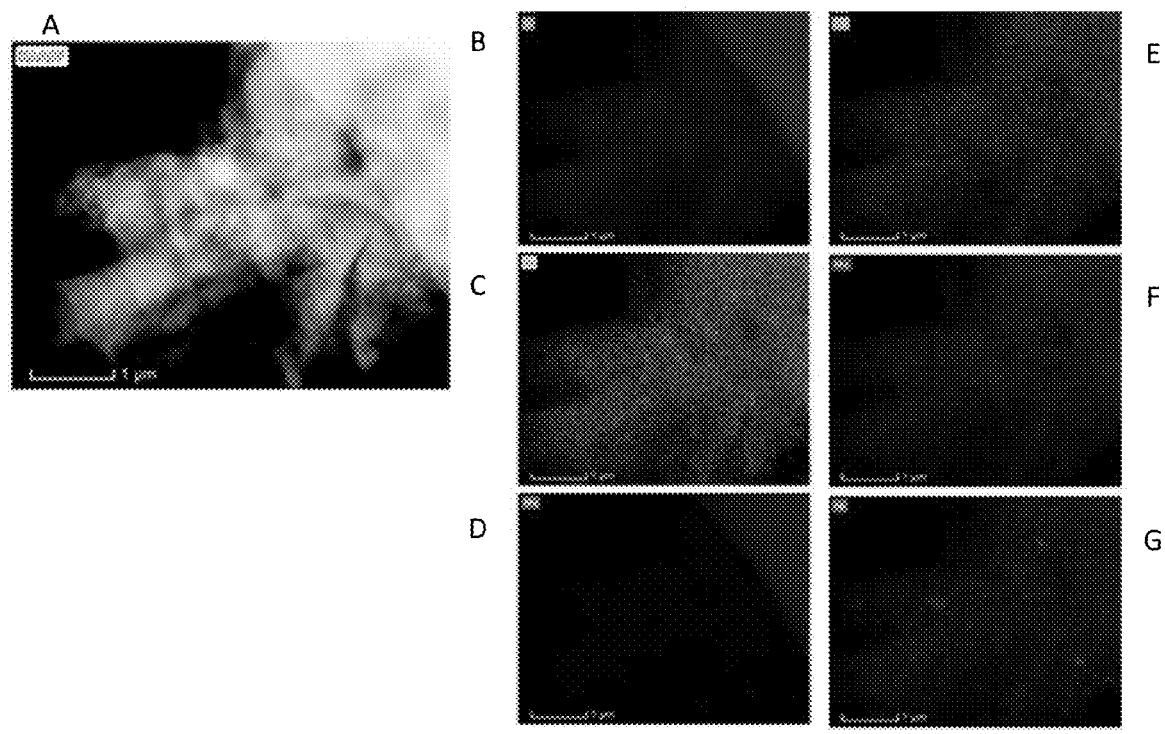
FIGS. 34A-34G are a TEM image (34A) and EDS elemental maps of cerium-rich particle in an Al-10Mg-8 wt % Ce carbonate composition showing presence of aluminum (34B), cerium (34C), magnesium (34D), gadolinium (34E), molybdenum (34F), and iron (34G).
Figures 35A, 35B, 35C, 35D, 35E, 35F, 35G:
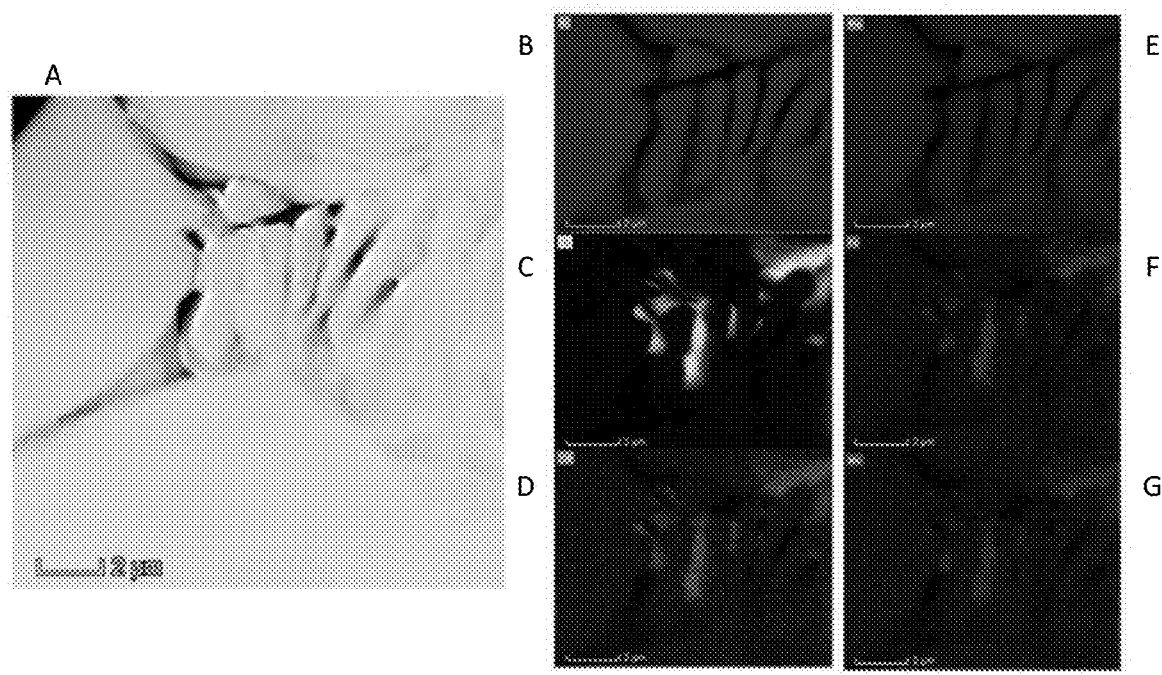
FIGS. 35A-35G are a TEM image (35A) and EDS elemental maps of laths formed during solidification of an Al-10Mg-8 wt % Ce carbonate composition showing presence of aluminum (35B), cerium (35C), gadolinium (35D), magnesium (35E), iron (35F), and molybdenum (35G).
Figures 36A, 36B, 36C, 36D, 36E, 36F:
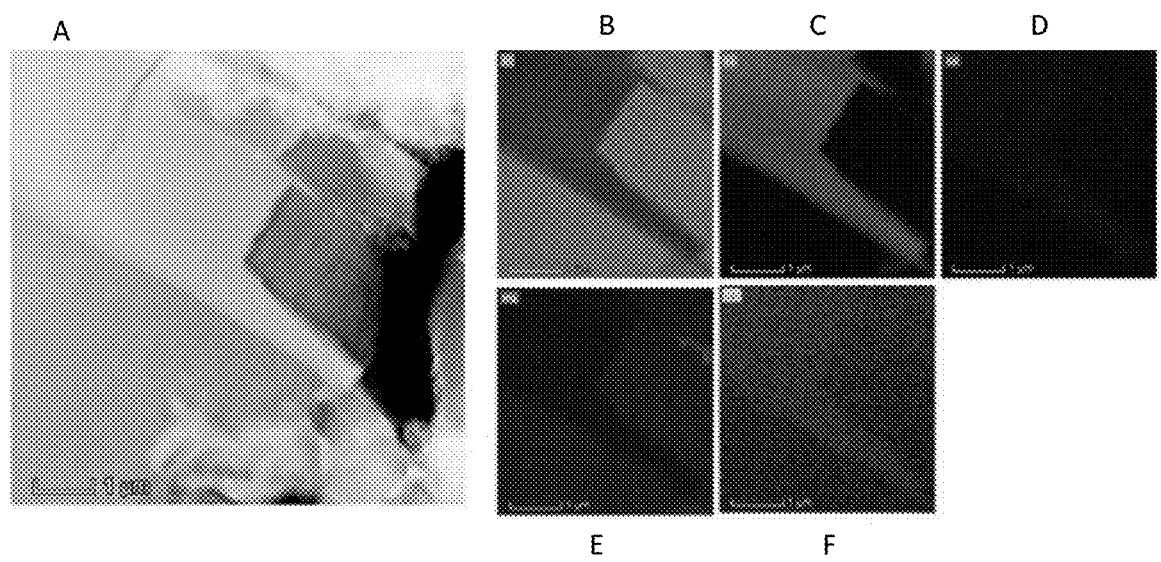
FIGS. 36A-36F are a TEM image (36A) and EDS elemental maps of a crystallite in an Al-10Mg-8 wt % Ce carbonate composition showing presence of aluminum (36B), cerium (36C), gadolinium (36D), magnesium (36E), and molybdenum (36F).

In some embodiments, the disclosed compositions include light metal oxide particles and/or unreacted precursor compound particles embedded in the microstructure of the solidified alloys (FIGS. 30-36). FIG. 30 is an SEM image (in backscatter electron (BSE) mode) of an Al-10Mg-8 wt % Ce carbonate composition, in which rare earth compounds appear brighter than Al- and Mg-based compounds and metals. The composition was prepared as described above without the application of current. The bright phases in the eutectic morphology in the microstructure formed as a result of successful aluminothermic reduction producing Ce in solution with the molten aluminum. FIG. 30 shows evidence of unreacted and/or partially reacted carbonate precursor particles (white particles) in the microstructure; gray particles are reacted particles. Unreacted particles arise from an incomplete aluminothermic reaction due to inadequate time, inadequate mixing, and/or thermodynamic factors.

FIGS. 31A-31G are a TEM image (31A) and electronic dispersive spectroscopy (EDS) elemental maps of a region taken from an Al-10Mg-8 wt % Ce carbonate composition produced with a carbonate precursor compound showing presence of aluminum (31B) and magnesium (31C) surrounding a central particle rich in cerium (31D) and contaminants from the precursor compound, including potassium (31E), chlorine (31F), and gadolinium (31G). The composition was prepared as described above without the application of current. The images provide evidence that reactant precursor particles may not be fully reacted or removed during reduction and therefore may be present in the solidified microstructure. FIGS. 32A-32I are a TEM image (32A) and EDS elemental maps of a region taken from an Al-10Mg-8 wt % Ce carbonate composition produced with a carbonate precursor compound showing presence of aluminum (32B), cerium (32C), magnesium (32D), iron (32E), chlorine (32F), molybdenum (32G), gadolinium (32H) and fluorine (32I). The composition was prepared as described above with application of 2.5 amps current. The elevated concentrations of trace elements such as iron, fluorine and gadolinium, which correlate to concentrations in the precursor compound) are characteristic of the direct reduction process. FIGS. 33A-33G are a TEM image (33A) and EDS elemental maps of an aluminum and magnesium rich region of an Al-10Mg-8 wt % Ce carbonate composition showing presence of chlorine (33B), fluorine (33C), cerium (33D), silicon (33E), magnesium (33F), and aluminum (33G). The composition was prepared as described above without the application of current. The concentrations of the contaminant elements correspond to those found in the precursor compound. FIGS. 34A-34G are a TEM image (34A) and EDS elemental maps of cerium-rich particle in an Al-10Mg-8 wt % Ce carbonate composition showing presence of aluminum (34B), cerium (34C), magnesium (34D), gadolinium (34E), molybdenum (34F), and iron (34G). The composition was prepared as described above with application of 2.5 amps current. The particle exhibits concentration amounts indicative of a precursor compound particle. FIGS. 35A-35G are a TEM image (34A) and EDS elemental maps of laths formed during solidification of an Al-10Mg-8 wt % Ce carbonate composition showing presence of aluminum (35B), cerium (35C), gadolinium (35D), magnesium (35E), iron (35F), and molybdenum (35G). The composition was prepared as described above with application of 2.5 amps current. The composition shows atomic fraction ratios appropriate for $Al_{11}Ce_3$; additionally, contaminant metals present in the precursor compound have migrated to within the laths. FIGS. 36A-36F are a TEM image (36A) and EDS elemental maps of a crystallite an Al-10Mg-8 wt % Ce carbonate composition showing presence of aluminum (36B), cerium (36C), gadolinium (36D), magnesium (36E), and molybdenum (36F). The composition was prepared as described above without the application of current. The crystallite shows atomic fraction ratios appropriate for $Al_{11}Ce_3$ and elevated levels of contaminant metals found in the precursor compound.

Successful direct reduction is expected to provide a composition with mechanical properties similar to those of traditionally processed alloys. Table 2 compares tensile strength, yield strength, and percent elongation (% E) of several compositions produced by embodiments of the disclosed method to a traditionally produced Al-8Ce-10Mg alloy. The number in front of the precursor (e.g., Ce carbonate) indicates the weight percent of the precursor added to the alloy. The actual percentage of Ce in the alloy is less; for example, $CeO_2$ is 81 wt % Ce. Two or three trials were each composition were performed according to the requirements of standard method ASTM E8.

TABLE 2

| Composition | Tensile (MPa) | Yield (MPa) | % E (MPa) |
|---|---|---|---|
| Al—8Ce carbonate-10Mg | 174 | 123 | 2.73 |
|  | 147 | 117 | 2.68 |
| Al—2Si—12Ce carbonate | 88.9 | 42.1 | 6.12 |
| with current | 77.2 | 38.6 | 5.82 |
| Al—2Si—12Ce carbonate | 99.3 | 81.4 | 10 |
| without current | 94.5 | 75.2 | 8.72 |
|  | 101 | 80.0 | 10.37 |
| Al—8CeO$_2$—10Mg | 170 | 135 | 1.48 |
| without current | 157 | 130 | 1.3 |
| Al—8Ce—10Mg | 228 | 186 | 1 |
| traditionally formed | 203 | 165 | 1.4 |

The data shows excellent mechanical properties for the cast compositions. Moreover, the measured mechanical properties for the Al-8CeO$_2$-10Mg composition are in line with the properties of traditionally formed Al-8Ce-10Mg.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A composition, comprising:
   an alloy comprising (i) a light metal comprising aluminum, magnesium, or a combination thereof, and (ii) an intermetallic comprising the light metal and a light rare earth element, the light rare earth element comprising cerium, lanthanum, mischmetal comprising 47-70 wt % cerium and 25-45 wt % lanthanum, or any combination thereof, wherein at least a portion of the intermetallic is present as eutectic colonies with a fishbone structure; and
   0.01-5 vol % of particles of an unreacted light rare earth element precursor compound comprising the light rare earth element, wherein the light rare earth element precursor compound comprises an oxide, a carbonate, a hydroxide, a chloride, a chlorite, a perchlorate, a fluoride, a fluorite, an oxalate, a sulfide, a sulfate, a sulfite, a phosphide, a phosphate or any combination thereof of the light rare earth element.

2. The composition of claim 1, further comprising 0.01% (v/v) to 10% (v/v) of a plurality of nanoparticles comprising an oxide of the light metal, wherein the nanoparticles have an average size within a range of from 10 nm to 500 nm.

3. The composition of claim 2, wherein:

(i) the light metal comprises aluminum, and the nanoparticles comprise aluminum oxide; or
   (ii) the light metal comprises magnesium, and the nanoparticles comprise magnesium oxide; or
   (iii) the light metal comprises a combination of aluminum and magnesium, and the nanoparticles comprise a combination of aluminum oxide, magnesium oxide, or magnesium aluminate, or any combination thereof.

4. The composition of claim 1, wherein the composition comprises 2 wt % to 60 wt % of the light rare earth element.

5. The composition of claim 1, wherein the light rare earth element comprises cerium.

6. The composition of claim 1, wherein the alloy further comprises silicon, zirconium, manganese, zinc, iron, nickel, copper, or any combination thereof.

7. The composition of claim 1, wherein the light rare earth element comprises cerium, and the unreacted light rare earth element precursor compound comprises cerium oxide, cerium carbonate, cerium hydroxide, or any combination thereof.

8. The composition of claim 1, wherein the particles of the unreacted light rare earth element precursor compound have an average size within a range of from 10 nm to 500 μm.

9. A method of making a composition, comprising:
   melting a light metal to form a melt, the light metal comprising aluminum, magnesium, or a combination thereof;
   agitating the melt to produce a vortex, an eddy current, cavitation, charge buildup, or any combination thereof within the melt;
   adding a powder comprising particles of a light rare earth element precursor compound to the melt while agitating the melt to reduce at least a portion of the light rare earth element precursor compound and form a molten composition comprising the light metal, the light rare earth element, and particles of unreacted light rare earth element precursor compound, the light rare earth element comprising cerium, lanthanum, mischmetal comprising 47-70 wt% cerium and 25-45 wt% lanthanum, or any combination thereof, and the light rare earth element precursor compound comprising an oxide, a carbonate, a hydroxide, a chloride, a chlorite, a perchlorate, a fluoride, a fluorite, an oxalate, a sulfide, a sulfate, a sulfite, a phosphide, a phosphate or any combination thereof of the light rare earth element; and
   cooling the molten composition to produce a composition comprising (i) an alloy of the light metal and an intermetallic comprising the light metal and the light rare earth element, wherein at least a portion of the intermetallic is present as eutectic colonies with a fishbone structure, and 0.01-5 vol% of particles of the unreacted light rare earth element precursor compound comprising the light rare earth element.

10. The method of claim 9, wherein agitating the melt comprises:
   (i) mechanically or magnetically stirring the melt; or
   (ii) ultrasonication of the melt; or
   (iii) application of a direct or alternating electrical current through the melt; or
   (iv) any combination of (i), (ii), and (iii).

11. The method of claim 9, wherein adding the powder comprising the light rare earth element precursor compound to the melt further comprises:
   fluidizing the powder with a gas to provide a fluidized powder; and
   injecting the fluidized powder into the melt below an upper surface of the melt.

12. The method of claim 9, wherein adding the powder comprising the light rare earth element precursor compound comprises:
selecting an amount of the powder comprising the light rare earth element precursor compound; and
serially adding fractions of the selected amount of the powder comprising the light rare earth element precursor compound to the melt at intervals while agitating the melt until all of the selected amount has been added.

13. The method of claim 12, wherein serially adding fractions of the selected amount of the powder comprising the light rare earth element precursor compound to the melt at intervals further comprises:
(a) adding a first fraction of the selected amount;
(b) agitating the melt for a period of time to reduce at least some of the first fraction;
(c) adding a subsequent fraction of the selected amount;
(d) agitating the melt for a subsequent period of time to reduce at least some of the subsequent fraction; and
(e) repeating steps (c) and (d) until all of the selected amount has been added.

14. The method of claim 9, wherein the light rare earth element precursor compound comprises cerium oxide, cerium carbonate, cerium hydroxide, or any combination thereof.

15. The method of claim 9, wherein:
(i) the molten composition further comprise particles comprising an oxide of the light metal, the method further comprising removing at least some of the particles comprising the oxide of the light metal from the molten composition before cooling the molten composition; or
(ii) the method further comprises removing at least some of the particles comprising unreacted light rare-earth element precursor compound from the molten composition before cooling the molten composition; or
(iii) both (i) and (ii).

16. The method of claim 15, wherein removing at least some of the particles comprising the oxide of the light metal or at least some of the particles comprising unreacted light rare earth element precursor compound comprises:
passing gas bubbles through the molten composition, whereby solid particles within the molten composition are conveyed by the gas bubbles to an upper surface of the molten composition, the solid particles comprising the particles comprising the oxide of the light metal, the particles comprising unreacted light rare earth element precursor compound, or both; and
removing the solid particles from the upper surface of the molten composition.

17. The method of claim 16, wherein the gas bubbles comprise nitrous oxide, chlorine, nitrogen, or argon.

18. The method of claim 9, wherein the method is a continuous or semi-continuous method, the method further comprising:
continuously adding light metal or serially adding amounts of the light metal to the melt at intervals with continuous agitation;
continuously adding powder comprising the light rare earth element precursor compound or serially adding amounts of the powder comprising the light rare earth element precursor compound to the melt at intervals with continuous agitation;
continuously transferring molten composition to a die caster or serially transferring portions of the molten composition at intervals to the die caster;
transferring molten composition from the die caster to a series of molds; and
cooling the molten composition in the molds to produce the composition.

19. A composition made by the method of claim 9.

* * * * *